United States Patent
Brunel et al.

(10) Patent No.: US 10,560,139 B2
(45) Date of Patent: Feb. 11, 2020

(54) DYNAMIC CONTROL OF SINGLE SWITCHED UPLINK VERSUS MULTI UPLINK

(71) Applicant: SKYWORKS SOLUTIONS, INC., Woburn, MA (US)

(72) Inventors: Dominique Michel Yves Brunel, Antibes (FR); David Richard Pehlke, Westlake Village, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 16/189,017

(22) Filed: Nov. 13, 2018

(65) Prior Publication Data

US 2019/0158137 A1    May 23, 2019

Related U.S. Application Data

(60) Provisional application No. 62/587,980, filed on Nov. 17, 2017, provisional application No. 62/701,048, (Continued)

(51) Int. Cl.
*H04B 1/44*    (2006.01)
*H04B 1/00*    (2006.01)
(Continued)

(52) U.S. Cl.
CPC .............. *H04B 1/44* (2013.01); *H04B 1/005* (2013.01); *H04B 1/04* (2013.01); *H04B 17/11* (2015.01); *H04B 2001/0408* (2013.01)

(58) Field of Classification Search
CPC . H04B 1/38; H04B 1/406; H04B 1/44; H04B 1/04
See application file for complete search history.

(56) References Cited

U.S. PATENT DOCUMENTS

2003/0114188 A1\* 6/2003 Rousu ............... H04B 1/005
                                                           455/553.1
2010/0157858 A1    6/2010 Lee et al.
(Continued)

FOREIGN PATENT DOCUMENTS

JP       2013-507864 A    3/2013
KR    10-2006-0069507 A    6/2006
(Continued)

OTHER PUBLICATIONS

3G Americas White Paper, "MIMO Transmissions Schemes for LTE and HSPA Networks," 3G Americas, Jun. 2009, 14 pages.
(Continued)

*Primary Examiner* — Tuan Pham
(74) *Attorney, Agent, or Firm* — Knobbe, Martens, Olson & Bear, LLP

(57) ABSTRACT

Apparatus and methods for dynamic control of single switched uplink versus multi uplink are provided. In certain embodiments, a mobile device includes a front end system including a first transmit chain and a second transmit chain. The mobile device further includes a transceiver that transmits a first type of RF signal and a second type of RF signal by way of the front end system. The transceiver is operable in a first mode in which transmissions of the first type of RF signal and the second type of RF signal are staggered, and a second mode in which transmissions of the first type of RF signal and the second type of RF signal at least partially overlap in time. The transceiver includes a transmit control circuit that operates the transceiver in the first mode or the second mode based on comparing a transmit parameter to a threshold.

20 Claims, 14 Drawing Sheets

Related U.S. Application Data filed on Jul. 20, 2018, provisional application No. 62/717,191, filed on Aug. 10, 2018.

(51) Int. Cl.
*H04B 1/04* (2006.01)
*H04B 17/11* (2015.01)

(56) References Cited

U.S. PATENT DOCUMENTS

| | | |
|---|---|---|
| 2013/0273859 A1 | 10/2013 | King et al. |
| 2013/0273860 A1 | 10/2013 | Pehlke |
| 2014/0321339 A1 | 10/2014 | Pehlke |
| 2015/0133067 A1 | 5/2015 | Chang et al. |
| 2015/0264688 A1 | 9/2015 | Kahrizi et al. |
| 2016/0006556 A1 | 1/2016 | Pehlke et al. |
| 2016/0044677 A1 | 2/2016 | King et al. |
| 2016/0127016 A1 | 5/2016 | Pehlke et al. |
| 2016/0134414 A1 | 5/2016 | Pehlke |
| 2016/0135172 A1 | 5/2016 | Sun et al. |
| 2016/0241026 A1 | 8/2016 | Pehlke |
| 2016/0241138 A1 | 8/2016 | Pehlke |
| 2016/0241197 A1 | 8/2016 | Pehlke |
| 2016/0241294 A1 | 8/2016 | Pehlke et al. |
| 2016/0242057 A1 | 8/2016 | Ripley et al. |
| 2016/0301437 A1 | 10/2016 | Pehlke |
| 2016/0345298 A1 | 11/2016 | Frank |
| 2016/0365908 A1 | 12/2016 | Chang et al. |
| 2017/0013565 A1 | 1/2017 | Pelletier et al. |
| 2017/0026074 A1 | 1/2017 | King et al. |
| 2017/0048028 A1 | 2/2017 | Pehlke |
| 2017/0111066 A1 | 4/2017 | King et al. |
| 2017/0111074 A1 | 4/2017 | King et al. |
| 2017/0188366 A1* | 6/2017 | Zhang .................. H04L 1/0006 |
| 2017/0195106 A1 | 7/2017 | Pehlke |
| 2017/0222665 A1 | 8/2017 | Chang et al. |
| 2017/0238308 A1 | 8/2017 | Tiirola et al. |
| 2017/0244538 A1 | 8/2017 | Chang et al. |
| 2017/0373730 A1 | 12/2017 | Pehlke et al. |
| 2018/0019768 A1 | 1/2018 | King et al. |
| 2018/0048345 A1 | 2/2018 | Pehlke et al. |
| 2018/0076774 A1 | 3/2018 | Pehlke et al. |
| 2018/0131500 A1 | 5/2018 | Pehlke |
| 2018/0159577 A1 | 6/2018 | Pehlke et al. |
| 2018/0205530 A1 | 7/2018 | Pehlke |
| 2018/0294858 A1 | 10/2018 | Pehlke |
| 2018/0323947 A1 | 11/2018 | Brunel et al. |
| 2018/0352510 A1* | 12/2018 | Wang .................. H04B 7/0617 |
| 2018/0367173 A1 | 12/2018 | King et al. |
| 2019/0007073 A1 | 1/2019 | King et al. |
| 2019/0115946 A1 | 4/2019 | Pehlke |

FOREIGN PATENT DOCUMENTS

| | | |
|---|---|---|
| KR | 10-2016-0020378 A | 2/2016 |
| WO | WO 2010/075190 A2 | 7/2010 |
| WO | WO 2017/078326 A1 | 5/2017 |

OTHER PUBLICATIONS

3G PP TS 36.211, version 12.4.0 Release 12, "ETSI TS 136 211 V. 12.4.0 Technical Specification", Feb. 2015, pp. 13-56.
3GPP TS 36.213, version 12.4.0, Release 12, "ETSI TS 136 213 v12.4.0 Technical Specification," Feb. 2015, pp. 165-215.
3GPP TS 36.213, Version 12.4.0, Release 12, "ETSI TS 136 213 v.12.4.0" Feb. 2015, pp. 127-151.
3GPP TSG RAN WG1, #54 meeting, Discussion memo from Mitsubishi Electric titled Uplink transmit diversity schemes with low cubic metric for LTE-Advanced, Agenda Item 12, Jeju, South Korea, Aug. 18-22, 2008, 6 pages.
3GPP TSG RAN WG1, #54bis, Discussion memo from Huawei titled Initial comparison of UL TX diversity solutions for LTE-Advanced, Prague, Czech Republic, Sep. 29-Oct. 3, 2008, 10 pages.
3GPP TSG RAN WG1, #57bis, Discussion memo from Huawei titled Comparison of UL TX diversity solutions for PUSCH, Los Angeles, USA, Jun. 29-Jul. 3, 2009, 6 pages.
3GPP TSG RAN WG1, #57bis, Discussion and decision memo titled OUCCH TxD Schemes for LTE-A, Los Angeles, USA, Jun. 29-Jul. 3, 2009, 6 pages.
Bulus, U., et al., "Modelling of the Monopole Interaction with a small Chassis," University Duisburg-Essen, Hochfrequenztechnik, Bismarckstr.81,D-47048, Germany, 2009, 4 pages.
Park, C.S., et al., "Evolutions of Uplink MIMO for LTE-Advanced," IEEE Communications Magazine, Feb. 2011, pp. 112-121.
Villanen, J., "A Wideband Study of the Bandwidth, SAR and Radiation Efficiency of Mobile Terminal Antenna Structures," IEEE International workshop on Antenna Technology, Mar. 2007, pp. 49-52.
Schulz, B., White Paper, "LTE Transmissions Modes and Beamforming" Rhode & Schwarz LTE Beamforming, Jul. 2015, 25 pages.
Simonsson, A., et al., "LTE Downlink 2x2 MIMO with Realistic CSI: Overview and Performance Evaluation," WCNC 2010 proceedings, 6 pages.
Fiberhome, "Discussion on uplink power sharing for LTE-NR," R1-1712271, 3GPP TSG RAN WG1 Meeting #90, Prague, Czech Republic, Aug. 4, 2017, in 2 pages.
International Search Report and Written Opinion of the International Searching Authority for International Application No. PCT/US2018/059691 dated Feb. 27, 2019 in 11 pages.

\* cited by examiner

DYNAMIC CONTROL OF SINGLE SWITCHED UPLINK VERSUS MULTI UPLINK

CROSS-REFERENCE TO RELATED APPLICATIONS

This application claims the benefit of priority under 35 U.S.C. § 119 of U.S. Provisional Patent Application No. 62/717,191, filed Aug. 10, 2018 and titled "DYNAMIC CONTROL OF SINGLE SWITCH UPLINK VERSUS MULTI UPLINK," and of Provisional Patent Application No. 62/701,048, filed Jul. 20, 2018 and titled "SINGLE VERSUS MULTI ANTENNA AND POWER AMPLIFIER MODE BASED ON POWER THRESHOLD," and of Provisional Patent Application No. 62/587,980, filed Nov. 17, 2017 and titled "SINGLE VERSUS MULTI ANTENNA AND POWER AMPLIFIER MODE BASED ON POWER THRESHOLD," each of which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 450 MHz to about 6 GHz for certain communications standards.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a mobile device. The mobile device includes a plurality of antennas including a first antenna and a second antenna, a front end system including a plurality of transmit chains including a first transmit chain electrically connected to the first antenna and a second transmit chain electrically connected to the second antenna, and a transceiver configured to transmit a first type of radio frequency signal and a second type of radio frequency signal through the front end system. The transceiver is operable in a first mode in which transmissions of the first type of radio frequency signal and the second type of radio frequency signal are staggered over time, and a second mode in which transmissions of the first type of radio frequency signal and the second type of radio frequency signal at least partially overlap in time. The transceiver further includes a transmit control circuit configured to operate the transceiver in the first mode or the second mode based on comparing a transmit parameter to a threshold.

In some embodiments, the transmit parameter is signal sensitivity and the threshold is a sensitivity threshold. According to a number of embodiments, the sensitivity threshold is maximum sensitivity degradation (MSD).

In various embodiments, the transmit parameter is power reduction and the threshold is a power reduction threshold. In accordance with a number of embodiments, the power reduction threshold is additional maximum power reduction (A-MPR).

In several embodiments, the first type of radio frequency signal is a long term evolution (LTE) signal, and the second type of signal is a fifth generation (5G) signal.

In some embodiments, the mobile device further includes a memory having calibration data programmed therein, the threshold based on the calibration data.

In various embodiments, the first type of radio frequency signal and the second type of signal are in a common frequency band.

In several embodiments, the transceiver is further configured to transmit the first type of radio frequency signal through the first transmit chain and the second type of radio frequency signal through the second transmit chain when a transmit power level is greater than a power threshold. According to a number of embodiments, the transceiver is further configured to transmit the first type of radio frequency signal and the second type of radio frequency signal through the first transmit chain when the transmit power level is less than or equal to the power threshold.

In some embodiments, in the second mode, the transceiver is configured to transmit the first type of radio frequency signal by way of the first transmit chain and to transmit the second type of radio frequency signal by way of the second transmit chain.

In several embodiments, in the second mode, the transceiver is configured to simultaneously transmit the first type of radio frequency signal and the second type of radio frequency signal by way of the first transmit chain.

In various embodiments, in the first mode, the transceiver is configured to transmit the first type of radio frequency signal by way of the first transmit chain and to transmit the second type of radio frequency signal by way of the second transmit chain.

In a number of embodiments, in the first mode, the transceiver is configured to alternate between transmitting the first type of radio frequency signal by way of the first transmit chain and to transmitting the second type of radio frequency signal by way of the first transmit chain.

In certain embodiments, the present disclosure relates to a radio frequency communication system. The radio frequency communication system includes a plurality of power amplifiers configured to provide signal amplification, and a transceiver configured to transmit a first type of radio frequency signal and a second type of radio frequency signal via the plurality of power amplifiers. The transceiver is operable in a first mode in which transmissions of the first type of radio frequency signal and the second type of radio frequency signal are staggered over time, and a second mode in which transmissions of the first type of radio frequency signal and the second type of radio frequency signal at least partially overlap in time. The transceiver includes a transmit control circuit configured to operate the transceiver in the first mode or the second mode based on comparing a transmit parameter to a threshold.

In various embodiments, the transmit parameter is signal sensitivity and the threshold is a sensitivity threshold.

In several embodiments, the transmit parameter is power reduction and the threshold is a power reduction threshold.

In certain embodiments, the present disclosure relates to a method of transmission in a radio frequency communication device. The method includes processing a first type of radio frequency signal and a second type of radio frequency signal for transmission using a front end system including a plurality of transmit chains, operating a transceiver in a first mode or a second mode based on comparing a transmit parameter to a threshold, and transmitting the first type of radio frequency signal and the second type of radio frequency signal through the front end system using the transceiver, including staggering transmissions of the first type of radio frequency signal and the second type of radio frequency signal when operating in the first mode, and transmitting the first type of radio frequency signal and the second type of radio frequency signal at least partially overlapping in time when operating in the second mode.

In some embodiments, the transmit parameter is signal sensitivity and the threshold is a sensitivity threshold.

In various embodiments, the transmit parameter is power reduction and the threshold is a power reduction threshold.

In certain embodiments, the present disclosure relates to a mobile device. The mobile device includes a plurality of antennas including a first antenna and a second antenna, a front end system including a plurality of transmit chains including a first transmit chain electrically connected to the first antenna and a second transmit chain electrically connected to the second antenna, and a transceiver configured to transmit a first type of radio frequency signal and a second type of radio frequency signal by way of the front end system. The transceiver is operable in a first mode in which transmissions of the first type of radio frequency signal and the second type of radio frequency signal are switched over time, and a second mode in which transmissions of the first type of radio frequency signal and the second type of radio frequency signal at least partially overlap in time. The transceiver includes a transmit control circuit configured to dynamically control operation of the transceiver in the first mode or the second mode based on a comparison of a transmit parameter to a threshold.

In several embodiments, the threshold is a sensitivity threshold. According to various embodiments, the threshold is maximum sensitivity degradation (MSD).

In some embodiments, the threshold is a power reduction threshold. In accordance with a number of embodiments, the threshold is additional maximum power reduction (A-MPR).

In various embodiments, the first type of radio frequency signal is a long term evolution (LTE) signal, and the second type of signal is a fifth generation (5G) signal.

In several embodiments, the mobile device further includes a memory having calibration data programmed therein, the threshold based on the calibration data.

In a number of embodiments, the first type of radio frequency signal and the second type of signal are in a common frequency band.

In various embodiments, the transceiver is further configured to transmit the first type of radio frequency signal through the first transmit chain and the second type of radio frequency signal through the second transmit chain when a transmit power level is greater than a power threshold. According to several embodiments, the transceiver is further configured to transmit the first type of radio frequency signal and the second type of radio frequency signal through the first transmit chain when the transmit power level is less than or equal to the power threshold.

In some embodiments, in the second mode, the transceiver is configured to transmit the first type of radio frequency signal by way of the first transmit chain and to transmit the second type of radio frequency signal by way of the second transmit chain.

In a number of embodiments, in the second mode, the transceiver is configured to simultaneously transmit the first type of radio frequency signal and the second type of radio frequency signal by way of the first transmit chain.

In various embodiments, in the first mode, the transceiver is configured to transmit the first type of radio frequency signal by way of the first transmit chain and to transmit the second type of radio frequency signal by way of the second transmit chain.

In several embodiments, in the first mode, the transceiver is configured to alternate between transmitting the first type of radio frequency signal by way of the first transmit chain and to transmitting the second type of radio frequency signal by way of the first transmit chain.

In certain embodiments, the present disclosure relates to a radio frequency communication system. The radio frequency communication system includes at least one transmit chain configured to process radio frequency signals for wireless transmission, and a transceiver configured to transmit a first type of radio frequency signal and a second type of radio frequency signal by way of the at least one transmit chain. The transceiver is operable in a first mode in which transmissions of the first type of radio frequency signal and the second type of radio frequency signal are switched over time, and a second mode in which transmissions of the first type of radio frequency signal and the second type of radio frequency signal at least partially overlap in time. The transceiver further includes a transmit control circuit configured to dynamically control operation of the transceiver in the first mode or the second mode based on a comparison of a transmit parameter to a threshold.

In several embodiments, the threshold is a sensitivity threshold. According to various embodiments, the threshold is maximum sensitivity degradation (MSD).

In some embodiments, the threshold is a power reduction threshold. In accordance with a number of embodiments, the threshold is additional maximum power reduction (A-MPR).

In various embodiments, the first type of radio frequency signal is a long term evolution (LTE) signal, and the second type of signal is a fifth generation (5G) signal.

In a number of embodiments, the radio frequency communication system further includes a memory having calibration data programmed therein, the threshold based on the calibration data.

In some embodiments, the first type of radio frequency signal and the second type of signal are in a common frequency band. According to several embodiments, the at least one transmit chain includes a first transmit chain and a second transmit chain, the transceiver further configured to transmit the first type of radio frequency signal through the first transmit chain and the second type of radio frequency signal through the second transmit chain when a transmit power level is greater than a power threshold. In accordance with a number of embodiments, the transceiver is further configured to transmit the first type of radio frequency signal and the second type of radio frequency signal through the first transmit chain when the transmit power level is less than or equal to the power threshold.

In various embodiments, the at least one transmit chain includes a first transmit chain configured to transmit on a first antenna and a second transmit chain configured to transmit on a second antenna. According to several embodiments, in the second mode, the transceiver is configured to transmit the first type of radio frequency signal by way of the first transmit chain and to transmit the second type of radio frequency signal by way of the second transmit chain. In accordance with some embodiments, in the second mode, the transceiver is configured to simultaneously transmit the first type of radio frequency signal and the second type of radio frequency signal by way of the first transmit chain. According to a number of embodiments, in the first mode, the transceiver is configured to transmit the first type of radio frequency signal by way of the first transmit chain and to transmit the second type of radio frequency signal by way of the second transmit chain. In accordance with several embodiments, in the first mode, the transceiver is configured to alternate between transmitting the first type of radio frequency signal by way of the first transmit chain and to transmitting the second type of radio frequency signal by way of the first transmit chain.

In certain embodiments, the present disclosure relates to a radio frequency communication system. The radio frequency communication system includes two or more transmit chains including a first transmit chain and a second transmit chain configured to transmit on different antennas, and a transceiver configured to control transmission of a radio frequency signal within a frequency band based on comparing a transmit power level of the radio frequency signal to a power threshold. The transceiver is further configured to transmit the radio frequency signal by way of the first transmit chain when the transmit power level is less than or equal to the power threshold, and to transmit the radio frequency signal by way of both the first transmit chain and the second transmit chain when the transmit power level is greater than the power threshold.

In some embodiments, when the transmit power level is greater than the power threshold, the transceiver is further configured to partition the radio frequency signal into a first radio frequency signal component for transmission via the first transmit chain and a second radio frequency signal component for transmission via the second transmit chain. According to several embodiments, the first radio frequency signal component and the second radio frequency signal component correspond to non-contiguous resource block allocations in a common channel of the frequency band. In accordance with various embodiments, the first radio frequency signal component corresponds to a first resource block allocation in a first channel of the frequency band, and the second radio frequency signal component corresponds to a second resource block allocation in a second channel of the frequency band. According to a number of embodiments, the first channel and the second channel are contiguous in frequency but the first and second resource block allocations are non-contiguous. In accordance with several embodiments, the first channel and the second channel are non-contiguous in frequency and the first and second resource block allocations are separated in frequency. According to a number of embodiments, the first and second resource block allocations are separated in frequency by less than about 35 megahertz.

In several embodiments, the frequency band is specified by Third Generation Partnership Project. According to a number of embodiments, the frequency band is specified by Long Term Evolution.

In some embodiments, the radio frequency signal is a carrier aggregated signal.

In a number of embodiments, the first transmit chain includes a first power amplifier, and the second transmit chain includes a second power amplifier.

In various embodiments, the frequency band corresponds to Band 71 or Band 41.

In several embodiments, the frequency band corresponds to Band 42, Band n78, or Band 79.

In certain embodiments, the present disclosure relates to a mobile device. The mobile device includes a plurality of antennas including a first antenna and a second antenna, a front end system including a first front-end module electrically connected to the first antenna and a second front-end module electrically connected to the second antenna, and a transceiver configured to control transmission of a radio frequency signal within a frequency band based on comparing a transmit power level of the radio frequency signal to a power threshold. The transceiver is further configured to transmit the radio frequency signal by way of the first front-end module and the first antenna when the transmit power level is less than or equal to the power threshold, and to transmit the radio frequency signal both by way of the first front-end module and the first antenna and by way of the second front-end module and the second antenna when the transmit power level is greater than the power threshold.

In some embodiments, when the power level is greater than the power threshold, the transceiver is further configured to partition the radio frequency signal into a first radio frequency signal component for transmission via the first front-end module and the first antenna and a second radio frequency signal component for transmission via the second front-end module and the second antenna. According to several embodiments, the first radio frequency signal component and the second radio frequency signal component correspond to non-contiguous resource block allocations in a common channel of the frequency band. In accordance with a number of embodiments, the first radio frequency signal component corresponds to a first resource block allocation in a first channel of the frequency band, and the second radio frequency signal component corresponds to a second resource block allocation in a second channel of the frequency band. According to various embodiments, the first channel and the second channel are contiguous in frequency but the first and second resource block allocations are non-contiguous. In accordance with several embodiments, the first channel and the second channel are non-contiguous in frequency and the first and second resource block allocations are separated in frequency. According to a number of embodiments, the first and second resource block allocations are separated in frequency by less than about 35 megahertz.

In several embodiments, the frequency band is specified by Third Generation Partnership Project. According to a number of embodiments, the frequency band is specified by Long Term Evolution.

In various embodiments, the radio frequency signal is a carrier aggregated signal.

In some embodiments, the first transmit chain includes a first power amplifier, and the second transmit chain includes a second power amplifier.

In several embodiments, the frequency band corresponds to Band 71 or Band 41.

In a number of embodiments, the frequency band corresponds to Band 42, Band n78, or Band 79.

In certain embodiments, the present disclosure relates to a method of radio frequency communication. The method includes comparing a transmit power level of a radio frequency signal to a power threshold, the radio frequency signal in a frequency band. The method further includes transmitting the radio frequency signal using a first transmit chain in response to determining that the transmit power level is less than or equal to the power threshold, the first transmit chain coupled to a first antenna. The method further includes transmitting the radio frequency signal using both the first transmit chain and a second transmit chain in response to determining that the transmit power level is greater than the power threshold, the second transmit chain coupled to a second antenna.

In some embodiments, the method further includes partitioning the radio frequency signal into a first radio frequency signal component and a second radio frequency signal component when the power level is greater than the power threshold. According to several embodiments, the first radio frequency signal component and the second radio frequency signal component correspond to non-contiguous resource block allocations in a common channel of the frequency band. In accordance with various embodiments, the first radio frequency signal component corresponds to a first resource block allocation in a first channel of the frequency band, and the second radio frequency signal component corresponds to a second resource block allocation in a second channel of the frequency band. According to a number of embodiments, the first channel and the second channel are contiguous in frequency but the first and second resource block allocations are non-contiguous. In accordance with several embodiments, the first channel and the second channel are non-contiguous in frequency and the first and second resource block allocations are separated in frequency. According to various embodiments, the first and second resource block allocations are separated in frequency by less than about 35 megahertz.

In several embodiments, the frequency band is specified by Third Generation Partnership Project. According to a number of embodiments, the frequency band is specified by Long Term Evolution.

In some embodiments, the radio frequency signal is a carrier aggregated signal.

In various embodiments, the frequency band corresponds to Band 71 or Band 41.

In a number of embodiments, the frequency band corresponds to Band 42, Band n78, or Band 79.

In several embodiments, transmitting the radio frequency signal using both the first transmit chain and a second transmit chain includes amplifying a first component of the radio frequency signal using a first power amplifier and amplifying a second component of the radio frequency signal using a second power amplifier.

DETAILED DESCRIPTION OF EMBODIMENTS

Figure 1:
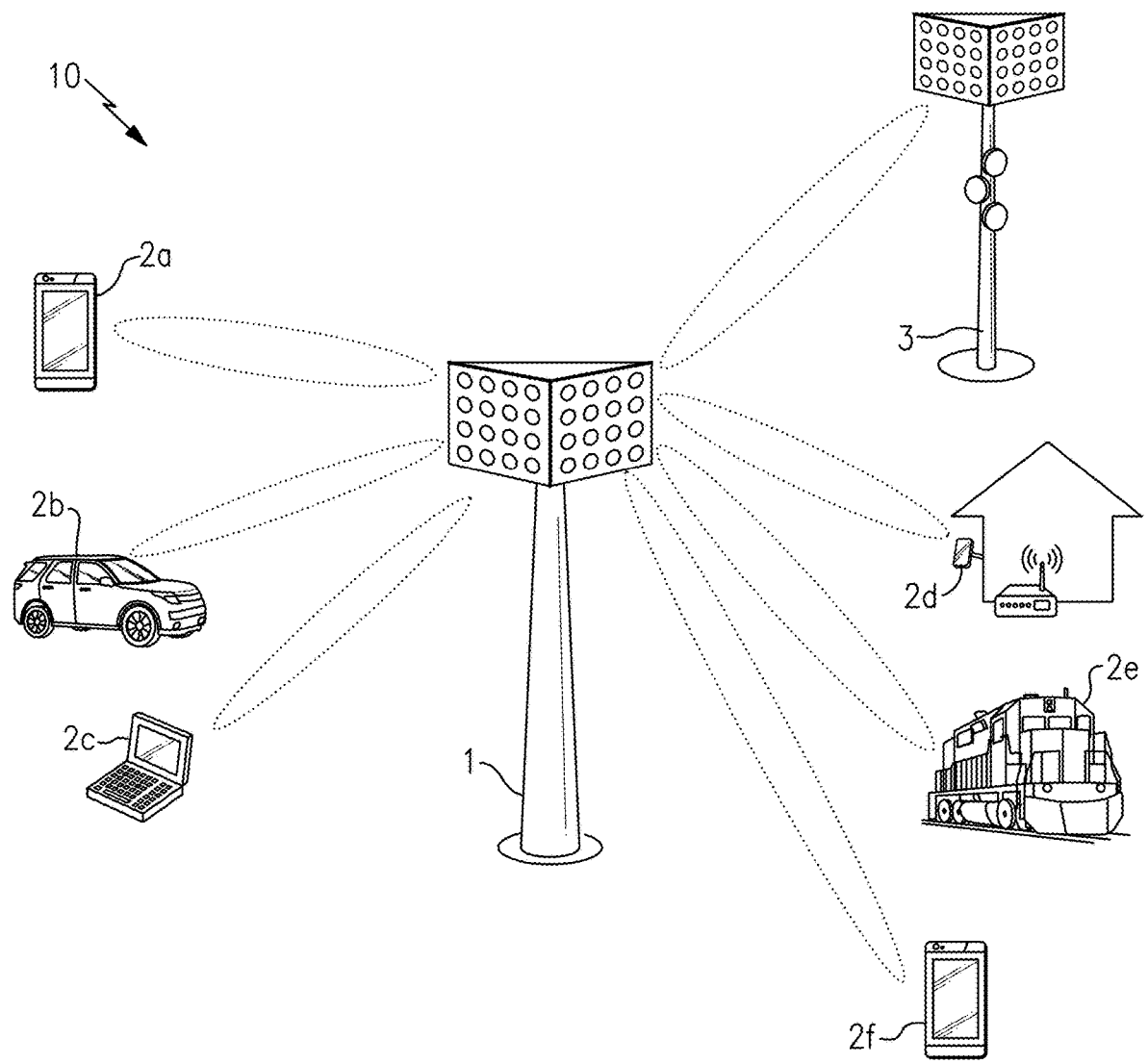
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, and a second mobile device 2f.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices.

The illustrated communication network 10 of FIG. 1 supports communications using a variety of technologies, including, for example, 4G LTE, 5G NR, and wireless local area network (WLAN), such as Wi-Fi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Examples of Radio Frequency Systems with Single Versus Multi Antenna and Power Amplifier Mode Based on Threshold Implementing RF communication systems to support modulation of a relatively wide bandwidth poses a number of technical challenges. For example, it can be difficult to extend bandwidth of an RF communication system to support digital pre-distortion (DPD) because of limitations in sampling rate capability and/or digital power consumption in the baseband modem.

Furthermore, intermodulation and associated spectral regrowth emissions of the transmit chain of the RF front-end become a limiting factor. For example, restrictions in out-of-channel and/or out-of-band emissions result in power back-offs and/or limited power capability for coverage of higher data rate features. For instance, certain maximum power reduction (MPR) back-offs are specified up to about 18 dB for non-contiguous resource block (RB) allocations in LTE. However, once power is backed-off to meet emission specifications, the resulting uplink power capability of the RF communication system (for instance, UE) is so low that the feature is virtually unusable due to the limited coverage area within the cell.

Conventional RF communication systems transmit a modulated signal through a single transmit chain associated with one power amplifier and one antenna. Thus, the power amplifier amplifies a full bandwidth of the modulated signal.

However, transmitting a modulated signal through a single transmit chain can lead to reduced performance when the modulated signal has wide bandwidth, for instance, a wide contiguous modulation or a modulation associated with separated resource block (RB) allocations. For example, when a transmit chain processes such a modulated signal, the circuit blocks along the transmit chain are constrained to operate with stringent linearity specifications to address limitations in permitted emission levels.

In certain embodiments herein, an RF communication system partitions a radio frequency signal associated with a particular frequency band into multiple signal components that are amplified using separate power amplifiers and transmitted via separate antennas. For example, a first power amplifier and a first antenna can be used for amplification and transmission of a first RF signal component of a frequency band, and a second power amplifier and a second antenna can be used for amplification of a second RF signal component of the same frequency band.

Thus, rather than processing a complete modulated signal (contiguous or non-contiguous) through one power amplifier and one antenna, the RF communication system partitions the modulation such that separate transmit chains (each with a power amplifier) amplify portions of the modulated signal for transmission on separate antennas.

By implementing the RF communication system in this manner, a number of benefits are achieved, including, but not limited to, relaxed baseband modulation sampling rate, relaxed DPD, enhanced RF front-end linearity, and/or higher transmit power. Moreover, enhanced RF front-end intermodulation performance is achieved by leveraging antenna isolation provided by separate transmissions. For example, for 5G NR, a two power amplifier/two antenna configuration better manages intermodulation distortion (IMD) products from 2 uplink (2 UL) in dual connectivity mode. Such IMD product management can be important in various applications, including, but not limited to, intra-band dual connectivity as well as inter-band dual connectivity.

Accordingly, superior intermodulation and/or emissions behavior can be achieved, thereby providing higher output power capability for UE. For example, the RF communication system can operate with transmissions that are more linear, and thus meet emissions specifications with little to no MPR. Furthermore, in certain implementations, the hardware supporting transmission of a partitioned modulation also can be used to support spatial diversity MIMO and/or transmit diversity for uplink communications, thereby enhancing flexibility.

By partitioning a modulation into separate signals for transmission via separate power amplifiers and antennas, higher transmit power and lower emissions can be achieved, even when the modulation is associated with non-contiguous clusters of concentrated signal power in separated RB allocations.

In certain embodiments herein, an RF communication system switches between a multi-power amplifier/multi-antenna mode and a single power amplifier/single antenna mode based on a threshold, such as comparison of a power level of the RF signal being transmitted to the power threshold.

Thus, an RF signal of a particular frequency band is partitioned into two or more RF signal components that are amplified by separate power amplifiers and transmitted by separate antennas when the transmit power level is relatively high. Thus, such transmissions benefit from lower IMD. However, when the transmit power level is relatively low (for instance, less than a power threshold), the IMD is manageable, and the RF communication system transmits the RF signal through a single power amplifier and antenna. Accordingly, the RF signal components are processed through a common transmit path when the RF signal's power is relatively low.

Such mode switching is applicable to a wide variety of communications bands, including, but not limited to, Band 41, Band 42, Band 71, Band n78 (Nokia), and/or Band 79. Furthermore, the teachings here are also applicable to LTE uplink carrier aggregation scenarios in which an extra power amplifier and antenna is utilized.

The RF communication systems herein can achieve superior intermodulation and/or emissions behavior, thereby providing higher output power capability for UE. For example, the RF communication system can operate with more linear transmissions, and thus meet emissions specifications with little to no MPR. Furthermore, in certain implementations, the hardware supporting transmission of a partitioned modulation also can be used to support spatial diversity MIMO, and/or transmit diversity for uplink communications, thereby enhancing flexibility.

By transmitting via separate power amplifiers and antennas above a power threshold, higher transmit power and/or lower emissions can be achieved, even when the modulation is associated with non-contiguous clusters of concentrated signal power in separated RB allocations.

Figure 2:
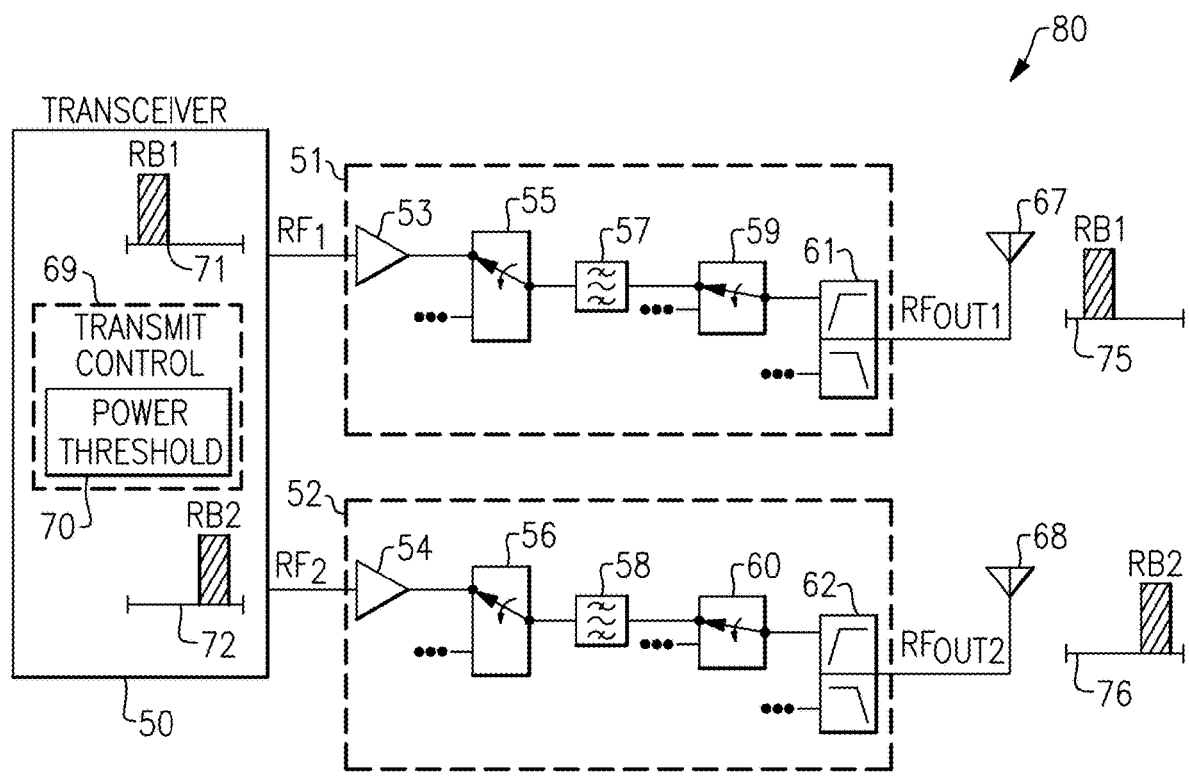
FIG. 2 is a schematic diagram of one embodiment of an RF communication system.

FIG. 2 is a schematic diagram of one embodiment of an RF communication system 80. The RF communication system 80 includes a transceiver 50, a first transmit chain 51, a second transmit chain 52, a first antenna 67, and a second antenna 68.

As shown in FIG. 2, the first transmit chain 51 includes a first power amplifier 53, a first transmit/receive switch 55, a first band filter 57, a first antenna switch 59, and a first diplexer 61. Additionally, the second transmit chain 52 includes a second power amplifier 54, a second transmit/receive switch 56, a second band filter 58, a second antenna switch 60, and a second diplexer 62.

Although one example implementation of transmit chains is shown, other implementations of transmit chains are possible. For example, a wide range of components and circuitry can be present between an output of a power amplifier and an antenna. Examples of such components and circuitry include, but are not limited to, switches, matching networks, harmonic termination circuits, filters, resonators, duplexers, detectors, directional couplers, bias circuitry, and/or frequency multiplexers (for instance, diplexers, triplexers, etc.). Furthermore, multiple instantiations of one or more components or circuits can be included in a transmit chain. Moreover, a wide range of components and circuitry can be present between the transceiver and an input to a power amplifier.

Thus, the transmit chains can include a wide variety of components. In one embodiment, the first transmit chain 51 is implemented on a first front-end module, and the second transmit chain 52 is implemented on a second front-end module. However, other implementations are possible.

The transceiver 50 operates to transmit a modulated signal including a first frequency content 71 associated with a first RB allocation RB1 and a second frequency content 72 associated with a second RB allocation RB2.

In the illustrated embodiment, the transceiver 50 includes a transmit control circuit 69, which switches the RF communication system 80 between a dual power amplifier/dual antenna mode and a single power amplifier/single antenna mode based on a power threshold 70. In certain implementations, the transmit control circuit 69 selects the mode based on comparing a transmit power level of the modulated signal to the power threshold 70.

When operating in the dual power amplifier/dual antenna mode, the first transmit chain 51 processes a first RF signal component $RF_1$ to generate a first RF output signal $RF_{OUT1}$, and the second transmit chain 52 processes a second RF signal component $RF_2$ to generate a second RF output signal $RF_{OUT2}$. As shown in FIG. 2, the first RF signal component $RF_1$ has the first frequency content 71 and the second RF signal component $RF_2$ has a second frequency content 72.

However, when operating in the single power amplifier/single antenna mode one of the transmit chains and corresponding antennas transmits the modulated signal, including both the frequency content 71 and the frequency content 72. For example, in the single power amplifier/single antenna mode, the modulated signal can be processed through the first transmit chain 51 and the first antenna 67 or through the second transmit chain 52 and second antenna 68.

In certain implementations, the transmit control circuit 69 operates the RF communication system 80 in the dual power amplifier/dual antenna mode when the power of the modulated signal desired to be transmitted is greater than the power threshold 70, and in the single power amplifier/single antenna mode when the power of the RF signal is less than or equal to the power threshold 70.

When operating in the dual power amplifier/dual antenna mode, the first RF signal component $RF_1$ and the second RF signal component $RF_2$ correspond to partitions of the modulated signal. For example, the first RF signal component $RF_1$ and the second RF signal component $RF_2$ can be associated with different RB allocations of one or more channels of a common frequency band. Examples of the first RF signal component $RF_1$ and the second RF signal component $RF_2$ are described below with reference to FIGS. 3A-3C.

When operating in the second mode, the first RF output signal $RF_{OUT1}$ and the second RF output signal $RF_{OUT2}$ have a frequency content 75 and a frequency content 76, respectively, in this embodiment. However, other frequency contents are possible. For example, diplexing can result in additional signal components at other signal frequencies.

Although an example in which the modulated signal is partitioned into two RF signal components in the dual power amplifier/dual antenna mode is shown, the teachings herein are also applicable to partitions of a modulated signal into three or more RF signal components. Thus, an RF communication system can include three or more transmit chains and three or more antennas for transmitting RF partitions of a modulated signal.

Figures 3A, 3B, 3C:
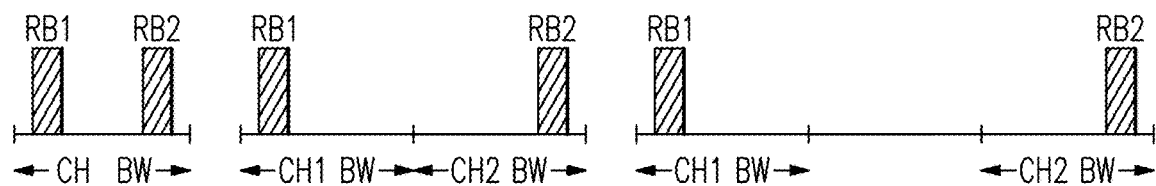
FIG. 3A is a frequency spectrum plot for one example of a single carrier with non-contiguous resource block (RB) allocation.
FIG. 3B is a frequency spectrum plot for one example carrier aggregation using two contiguous carriers with non-contiguous RB allocation.
FIG. 3C is a frequency spectrum plot for one example carrier aggregation using two nearby non-contiguous carriers with non-contiguous RB allocation.

FIG. 3A is a frequency spectrum plot for one example of a single carrier with non-contiguous RB allocation. FIG. 3A illustrates one example of resource block allocations corresponding to the first RF signal component $RF_1$ and second RF signal component $RF_2$ of FIG. 2.

As shown in FIG. 3A, the channel bandwidth (CH BW) of a single carrier of a frequency band is depicted. Additionally, a non-contiguous RB allocation is shown, including one or more resource blocks RB1 separated in frequency from one or more resource blocks RB2. Thus, the allocations for RB1 and RB2 are non-contiguous.

In various embodiments herein, an RF communication system is operable at transmit power levels above a threshold to transmit a first RF signal component associated with resource blocks RB1 through a first power amplifier and a first antenna, and to transmit a second RF signal component associated with resource blocks RB2 through a second power amplifier and a second antenna. Additionally, at transmit power levels below the threshold, the RF communication system is operable to transmit the modulated signal including both the resource blocks RB1 and the second resource blocks RB2 through a single power amplifier and single antenna.

Thus, an RF signal of a particular frequency band is partitioned into two or more RF signal components that are amplified by separate power amplifiers and transmitted by different antennas when the transmit power level is relatively high. Thus, such transmissions benefit from lower IMD. However, when the transmit power level is relatively low (for instance, less than a power threshold), the IMD is manageable, and the RF communication system transmits the RF signal through a single power amplifier and antenna.

FIG. 3B is a frequency spectrum plot for one example carrier aggregation using two contiguous carriers with non-contiguous RB allocation. FIG. 3B illustrates another example of resource block allocations corresponding to the first RF signal component $RF_1$ and second RF signal component $RF_2$ of FIG. 2.

As shown in FIG. 3B, the channel bandwidths of two contiguous carriers of a common frequency band are depicted. Additionally, a non-contiguous RB allocation is shown, including one or more resource blocks RB1 separated in frequency from one or more resource blocks RB2. Thus, the allocations for RB1 and RB2 are non-contiguous.

FIG. 3C is a frequency spectrum plot for one example carrier aggregation using two nearby non-contiguous carriers with non-contiguous RB allocation. FIG. 3C illustrates another example of resource block allocations corresponding to the first RF signal component $RF_1$ and second RF signal component $RF_2$ of FIG. 2.

As shown in FIG. 3C, the channel bandwidths of two nearby non-contiguous carriers of a common frequency band are depicted. The non-contiguous carriers are of the same frequency band and relatively close in frequency, for instance, separated by less than about 35 megahertz (MHz). Additionally, a non-contiguous RB allocation is shown, including one or more resource blocks RB1 separated in frequency from one or more resource blocks RB2. Thus, the allocations for RB1 and RB2 are non-contiguous.

Figure 4:
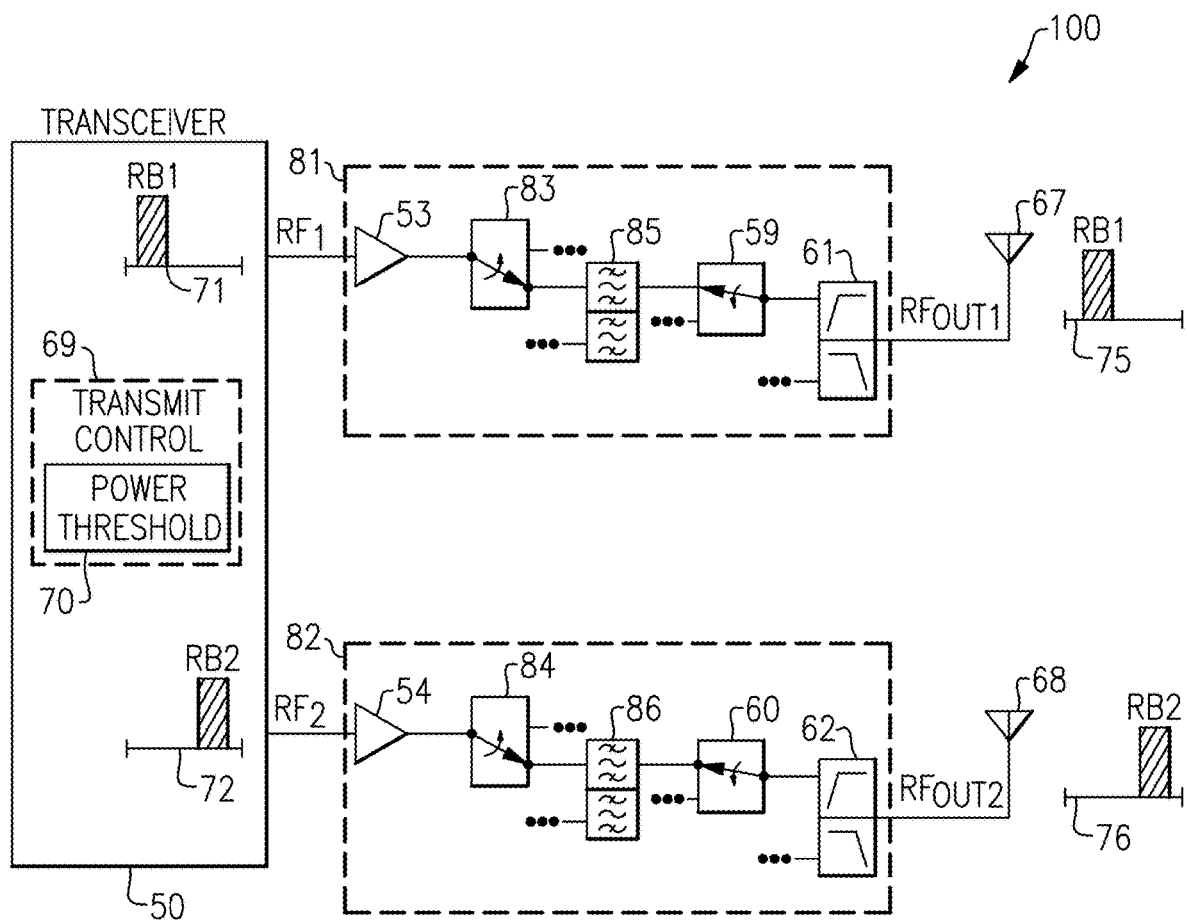
FIG. 4 is a schematic diagram of another embodiment of an RF communication system.

FIG. 4 is a schematic diagram of another embodiment of an RF communication system 100. The RF communication system 100 of FIG. 4 is similar to the RF communication system 80 of FIG. 2, except that the RF communication system 100 includes a different implementation of transmit chains.

For example, the RF communication system 100 of FIG. 4 includes a first transmit chain 81, which includes a first power amplifier 53, a first power amplifier output switch 83, a first duplexer 85, a first antenna switch 59, and a first diplexer 61. Additionally, the RF communication system 100 further includes a second transmit chain 82, which includes a second power amplifier 54, a second power amplifier output switch 84, a second duplexer 86, a second antenna switch 60, and a second diplexer 62.

Although FIG. 4 illustrates one example implementation of transmit chains, the teachings herein are applicable to transmit chains implemented in a wide variety of ways.

Figure 5:
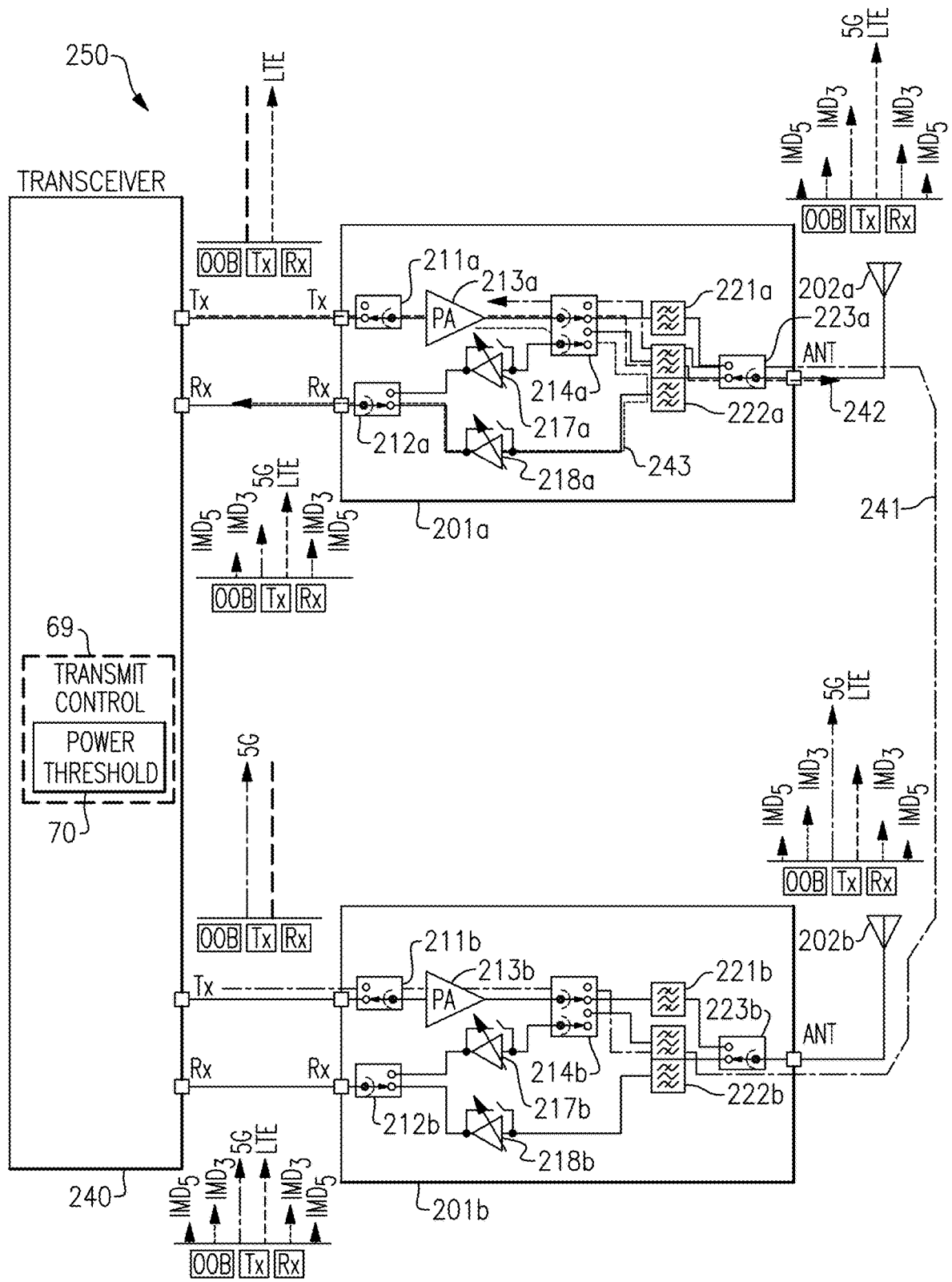
FIG. 5 is a schematic diagram of another embodiment of an RF communication system.

FIG. 5 is a schematic diagram of another embodiment of an RF communication system 250. The RF communication system 250 includes a transceiver 240, a first RF front-end module 201a, a second RF front-end module 201b, a first antenna 202a, and a second antenna 202b. The transceiver 240 includes the transmit control circuit 69, which controls a mode of the RF communication system 250 based on comparing a transmit power level to the power threshold 70, as described above.

As shown in FIG. 5, the first RF front-end module 201a includes a first transmit selection switch 211a, a first receive selection switch 212a, a first power amplifier 213a, a first band selection transmit/receive switch 214a, a first TDD low noise amplifier (LNA) 217a, a first FDD LNA 218a, a first TDD filter 221a, a first FDD duplexer 222a, and a first antenna switch 223a. Additionally, the second RF front-end module 201b includes a second transmit selection switch 211b, a second receive selection switch 212b, a second power amplifier 213b, a second band selection transmit/ receive switch 214*b*, a second TDD LNA 217*b*, a second FDD LNA 218*b*, a second TDD filter 221*b*, a second FDD duplexer 222*b*, and a second antenna switch 223*b*.

Although one example implementation of an RF communication system is shown in FIG. 5, the teachings herein are applicable to RF communication systems implemented in a wide variety of ways. For example, although one example of transmit chains is illustrated, other implementations of transmit chains are possible.

In this example, an LTE signal is transmitted through a first transmit chain associated with the first front-end module 201*a* and a 5G signal is transmitted through the a second transmit chain associated with the second front-end module 201*b*. The LTE signal and the 5G signal are in the same frequency band. In one embodiment, the LTE signal corresponds to an anchor carrier and the 5G signal corresponds to a secondary component carrier.

The RF communication system 250 has been annotated to show an LTE signal path 242, a 5G interferer signal path 241, and an intermodulation path 243. The intermodulation path 243 of FIG. 5 leads to relatively low intermodulation distortion. In particular, isolation between the first antenna 202*a* and the second antenna 202*b* results in a relatively small amount of the 5G signal from coupling from the second antenna 202*b* to the first antenna 202*a*. Moreover, intermodulation resulting from the 5G signal reaching the output of the first power amplifier 213*a* is relatively low, since output conversion gain of a power amplifier is typically much lower than input conversion gain. FIG. 5 has been annotated with example transmit (TX), receive (RX), and out-of-band (OOB) magnitude versus frequency plots for 5G, LTE, and intermodulation distortion (IMD) components. Both third-order IMD ($IMD_3$) and fifth-order IMD ($IMD_5$) components are depicted.

By partitioning an RF signal with a non-contiguous frequency allocation into multiple RF signals sent through separate transmit chains and separate antennas at transmit power levels above the power threshold 70, lower intermodulation distortion and emissions result. Thus, intermodulation and emissions specifications can be realized without needing to operate with large MPR back-off. Thus, the RF communication system 250 of FIG. 5 is associated with relatively high output power capability.

It is understood that the 5G signal 241 is depicted in FIG. 5 as a back-injected interferer to the upper transmit path of the LTE signal 242, but that symmetric behavior of the LTE signal 242 also leaks through the antenna isolation to serve as a similar back-injected interferer to the 5G signal transmission from antenna 202*b*. For clarity of the figures, just one of the interference mechanisms is depicted, but it is understood that a symmetric behavior of interference is present.

Example Analysis of Single PA/Antenna Versus Dual PA/Antenna Architectures

Figure 6A:
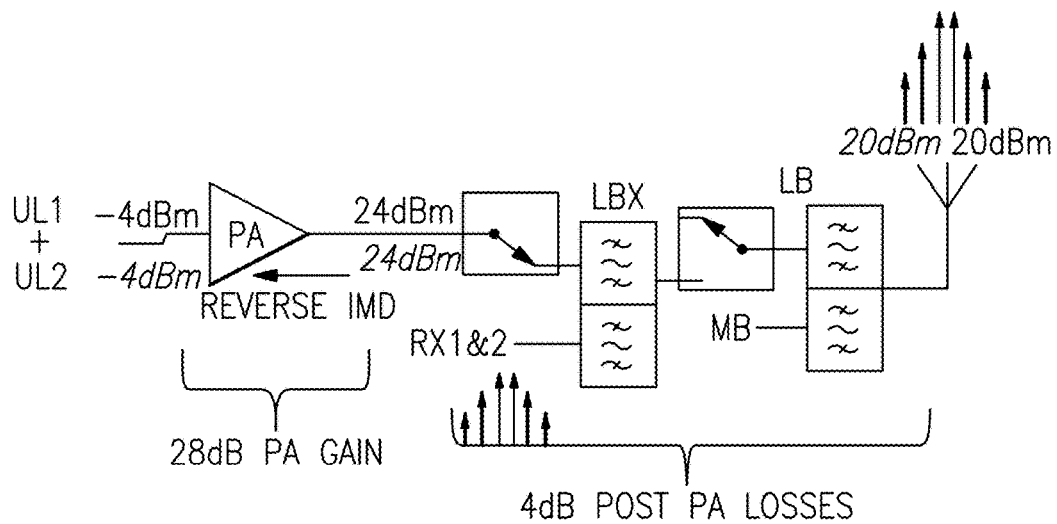
FIG. 6A is a schematic diagram of one embodiment of an RF communication system including annotations related to intermodulation distortion.

FIG. 6A is a schematic diagram of one embodiment of an RF communication system including annotations related to intermodulation distortion. The schematic diagram illustrates operation in a single PA/single antenna mode.

In this example, an RF signal including two signal components within the same frequency band is transmitted through a single transmit chain. The two signal components include a first component (UL1) and a second component (UL2). Example power levels are shown for UL1 and UL2 at different points in the chain, with power levels of UL2 italicized. The two signal components can correspond to an LTE component and a 5G component transmitted through the transmit chain. However, other signal components can be transmitted in accordance with the teachings herein.

In certain implementations, a communication network allocates a particular user device (for instance, a mobile phone or other UE) with a primary component carrier (PCC) or anchor carrier, which is used for communications when only a single frequency carrier is used. To enhance bandwidth, the PCC can be selectively aggregated with one or more secondary component carriers (SCCs). In certain implementations, an LTE component corresponds to an anchor carrier and a 5G component corresponds to a secondary component carrier, or vice versa.

Figure 6B:
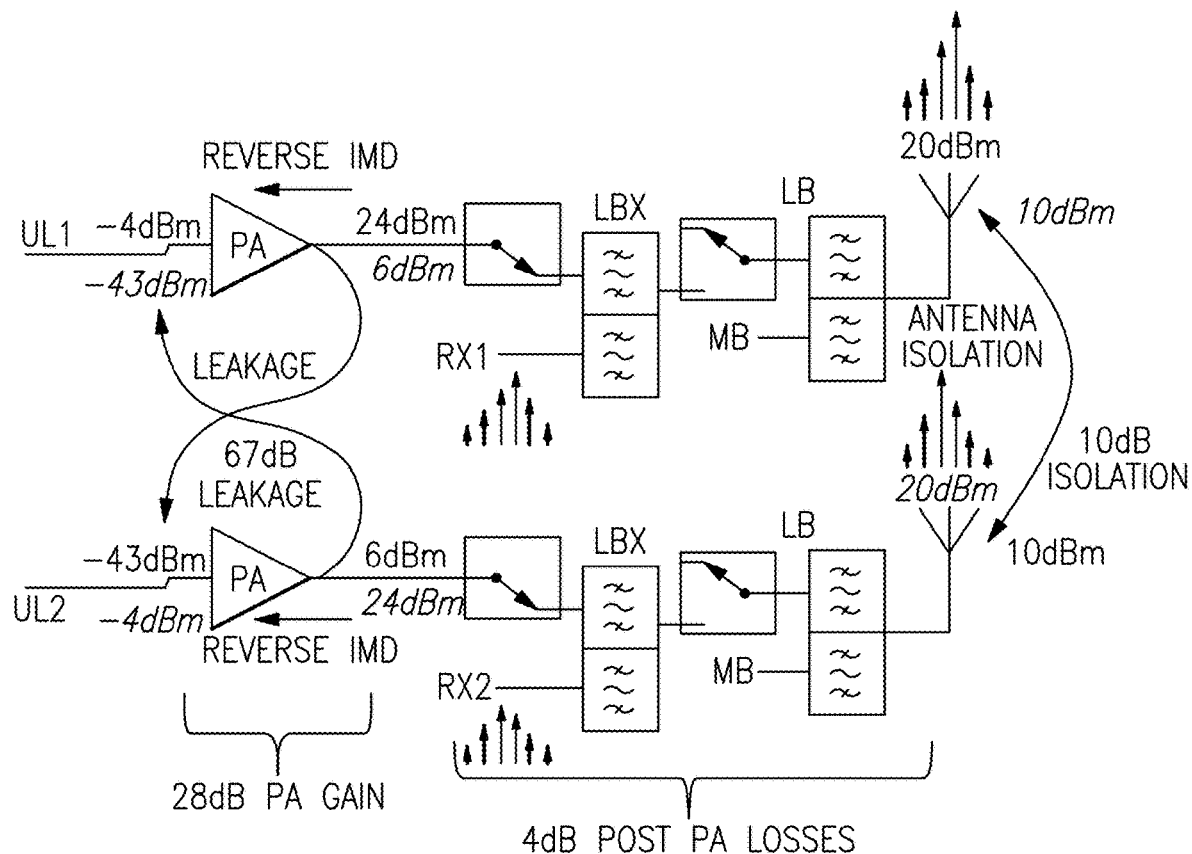
FIG. 6B is a schematic diagram of another embodiment of an RF communication system including annotations related to intermodulation distortion.

FIG. 6B is a schematic diagram of another embodiment of an RF communication system including annotations related to intermodulation distortion. The schematic diagram illustrates operation in a dual PA/dual antenna mode.

In contrast to the RF communication system of FIG. 6A, the two signal components are transmitted through separate transmit chains in FIG. 6B. Example power levels are shown for UL1 and UL2 at different points in the chain, with power levels of UL2 italicized.

With reference to FIGS. 6A and 6B, in order to make a first evaluation of the IMD related maximum sensitivity degradation (MSD) for adjacent LTE/NR DC in band 71, a set of assumptions and signal cases have been used as follows.

Initially, with respect to power sharing, as a first step equal power split was used at 20 dBm per carrier at the antenna, which was done as a simplification since equal PSD can be more relevant for collocated intra-band DC.

Secondly, with respect to power reduction, MPR was not applied on top of the 3 dB back-off per carrier, in this example. Thus, both discrete Fourier transformation-spread-orthogonal frequency division multiplexing (DFT-s-OFDM) and cyclic prefix orthogonal frequency division multiplexing (CP-OFDM) quadrature phase shift keying (QPSK) cases are each at 20 dBm per carrier.

Thirdly, the 20 MHz aggregated cases that were measured include (i) LTE 20 MHz and NR 20 MHz as reference cases; (ii) LTE 5 MHz+NR 15 MHz; and (iii) LTE 10 MHZ+NR 10 MHz.

Fourthly, both CP-OFDM and DFT-s-OFDM were used for comparison.

Fifthly, for partial allocations of RB allocations, the sum of LTE+NR RB is 20 as for an LTE REFSENS UL configuration case and split between LTE and NR proportionally to channel bandwidth (BW). The following RF allocations were measured: (i) full allocation LTE5+full allocation NR15; (ii) full allocation LTE10+Full allocation NR10; (iii) 5RB LTE5+15RB NR15; (iv) 10RB LTE10+10RB LTE; and (v) a few partial allocation positions were studied, as described further below.

Finally, 1PA/antenna (forward IMD) and 2PA/antenna (reverse IMD) architectures were measured including reverse and leakage paths for the 2PA/antenna case.

IMD Measurements

In Table 1 below, measured interference levels in the respective LTE and NR channels are measured. Since they correspond to a 20 MHz aggregated BW, they are compared with the 20 MHz LTE and NR SA cases. A number of dual connectivity configurations are measured, which use the labeling nomenclature below, where letters in italic bold correspond to the parameters:

Naming: *XX*RB_side LTE-BW dir+*YY*RB_side MOD_NR-BW dir

XX and YY: respective LTE and NR RB allocation

_side:_L=left (lowest frequencies),_R=right (highest frequencies), omitted for full allocations BW: respective LTE or NR channel BW in MHz dir: signal path: FW=forward, REV=reverse, LEAK=leakage, omitted for 1PA cases since FW by default MOD_: NR modulation type: CP_=CP-OFDM, DFT_=DFT-s-OFDM IMD measurements can be cumbersome and/or error prone, and thus a limited number of cases were measured. Nevertheless, sufficient aspects are explored to provide basis for comparisons and analysis.

Table 1 below shows a summary of 1PA/antenna and 2PA/antenna (including reverse and leakage path) measurements.

similar and CP-OFDM is worst case. Additionally, DFT-s-OFDM can be ignored in certain applications and/or implementations.

Thirdly, the following points are made with respect to DC#1_CP 1PA vs DC#1_CP 2PA and DC#4_CP 1PA vs DC#4_CP 2PA. For full allocation on both carrier 2PA architecture shows 20 dB improvement vs 1 PA architecture. Additionally, 2PA architecture shows 10-30 dB better performance than LTE 20 MHz for full allocation with higher number of aggregated RBs. Furthermore, 2 PA architecture enables better NR non-standalone (NSA) performance vs LTE for full RB allocation. Moreover, 1 PA architecture show only slightly worse performance for full allocation vs LTE 20 MHz with higher number of aggregated RBs. Furthermore, 1 PA architecture enables acceptable NR NSA performance vs LTE for full allocation.

TABLE 1

| case | XXRB_side LTE-BW dir + YYRB_side MOD_NR-BW dir | DL Interference Level | | LTE-20 REF |
|---|---|---|---|---|
| | | LTE PAout | NR PAout | |
| REF_LTE-20 | 20RB_L LTE-20 | −51.9 | N/A | N/A |
| | 100RB LTE-20 | −30.4 | N/A | N/A |
| REF_NRCP-20 | 20RB_L CP_NR-20 | N/A | −50.8 | N/A |
| REF_NRDFT-20 | 20RB_L DFT_NR-20 | N/A | −49.5 | N/A |
| DC#1_DF 1PA | 25RB LTE-5 + 75RB_L DFT_NR-15 | −34.9 | −24.8 | −30.4 |
| DC#1_CP 1PA | 25RB LTE-5 + 79RB CP_NR-15 | −34.9 | −23.7 | −30.4 |
| DC#1_CP 2PA | 25RB LTE-5 FW + 79RB CP_NR-15 REV | −48.4 | −34.7 | |
| | 25RB LTE-5 FW + 79RB CP_NR-15 LEAK | −67.4 | −60.9 | |
| | 25RB LTE-5 REV + 79RB CP_NR-15 FW | −55.8 | −42.8 | |
| | 25RB LTE-5 LEAK + 79RB CP_NR-15 FW | −67.3 | −61.6 | |
| | 25RB LTE-5 + 79RB CP_NR-15 | −48.3 | −42.8 | −30.4 |
| DC#2_CP 1PA | 5RB_L LTE-5 + 15RB_L CP_NR-15 | −48.2 | −34.4 | −51.9 |
| DC#3_CP 1PA | 5RB_L LTE-5 + 15RB_R CP_NR-15 | −42.0 | −19.1 | −51.9 |
| DC#4_DFT 1PA | 50RB LTE-10 FW + 50RB_L DFT_NR-10 FW | −27.4 | −28.1 | −30.4 |
| DC#4_CP 1PA | 50RB LTE-10 FW + 52RB CP_NR-10 FW | −27.6 | −27.2 | −30.4 |
| DC#4_CP 2PA | 50RB LTE-10 FW + 52RB_R CP_NR-10 REV | −47.9 | −47.5 | |
| | 50RB LTE-10 REV + 52RB_R CP_NR-10 FW | −61.8 | −62.0 | |
| | 50RB LTE-10 + 52RB_R CP_NR-10 | −47.9 | −62.0 | −30.4 |
| DC#5_CP 1PA | 10RB_L LTE-10 + 10RB_R CP_NR-10 | −19.7 | −19.3 | −51.9 |
| DC#5_CP 2PA | 10RB_L LTE-10 FW + 10RB_R CP_NR-10 REV | −62.9 | −62.8 | |
| | 10RB_L LTE-10 REV + 10RB_R CP_NR-10 FW | −63.7 | −63.5 | |
| | 10RB_L LTE-10 + 10RB_R CP_NR-10 | −62.9 | −63.5 | −51.9 |

A case by case discussion is now provided for certain cases noted in the Table 1.

First with respect to DC#1_CP 2PA, the measurement shows that leakage path results into approximately 20 dB lower interference level than the reverse IMD. Thus, the leakage path can be ignored or neglected in certain applications and/or implementations.

Secondly, the following points are made with respect DC#1_DF 1PA vs DC#1_CP 1PA and DC#4_DFT 1PA vs DC#4_CP 1PA. CP-OFDM and DFT-s-OFDM cases are Fourthly, the following points are made with respect to DC#2 CP 1PA vs DC#3_CP 1PA and DC#5_CP 1PA. When LTE partial allocation is on the left (lowest frequencies) and NR partial allocation are on the right side (highest frequencies) the performance is 20 dB worse than when both are on the left due to lower IMD order falling in NR RX Channel. In this case, the interfering level can be up to 30 dB worse than for LTE 20 MHz REFSENS case. Additionally, worst case partial RB allocation has poor performance for 1PA architecture. Furthermore, when both partial allocations are on the left (DC#2_CP 1PA) the interference level is only 10-15 dB worse than for LTE 20 MHz REFSENS case.

Moreover, for 1 PA architecture partial RB allocation position at the lower frequencies is an acceptable UL configuration. Furthermore, it is to be noted that quasi contiguous partial RB allocations is even better and potentially better than for LTE 20 MHz REFSENS case.

Fifthly, the following points are made with respect to with respect to DC#5_CP 1PA vs DC#5_CP 2PA. Where for the worst case partial allocations position the 1PA architecture show 30 dB degradation vs LTE 20 MHz REFSENS case the 2PA architecture shows 10 dB improvement. Additionally, 2 PA architecture enables better NR NSA performance vs LTE even with worst case partial allocations.

Further observations of the measurements are as follows. 2PA architecture outperforms 1PA architecture for DC_71A_n71 but also outperforms LTE or NR SA for the same aggregated BW and supports any full or partial RB allocations. To enable acceptable 1PA architecture DC_71A_n71 performance, partial allocations positions can be restricted.

DC_71A_n71A UL Configuration for REFSENS and Discussion of Example PA Architectures Initially, power sharing for UL configuration for REFSENS is discussed. Although equal power for each carrier in the measurements have been used, for these intra-band dual connectivity cases the scenario is for a collocated LTE and NR base station, and in this case power per RB should be similar for LTE and NR thus correspond to an equal PSD case.

If when using equal PSD for the LTE 10 MHz+NR 10 MHz cases with same RB allocation the power is still 20 dBm+20 dBm, for the LTE 5 MHZ+NR 15 MHz the levels are 17+21.8 dBm.

Thus, with respect to power sharing, equal PSD split is used for collocated intra-band DC.

With respect to allocation restriction, for the 2PA architecture it should be feasible to support all possible partial allocation positions and achieve same or better performance that the respective LTE or NR SA cases. The 1 PA architecture sees relatively high de-sense when partial allocations are placed the furthest apart between LTE and NR. To the contrary, if they placed close to each other in a quasi-contiguous manner, de-sense is lower than for LTE or NR cases used for REFSENS. Only one UE could benefit from such configuration. Thus, the case where partial allocations are placed at the lowest respective positions and proportionally to the LTE/NR BW is a good compromise that is quite comparable to the restricted allocation of LTE 20 MHz case.

The following cases are examples: (i) 5RB0 LTE 5 MHz+15RB0 NR 15 MHz; (ii) 10RB0 LTE 10 MHz+10RB0 NR 10 MHz; (iii) 15RB0 LTE 15 MHZ+5RB0 NR 5 MHz; and (iv) 20 MHz LTE REFSENS UL configuration in 20RB0.

Thus, with respect to UL configuration for configuration for REFSENS, for 2 PA architecture, RB allocation need not be restricted. Additionally, for 1PA architecture, partial RB allocation can be restricted to the lowest frequency position, total RB number is equal to the LTE REFSENS UL configuration corresponding to the same aggregated BW and split between LTE and NR proportionally to their respective channel bandwidths.

Next, architecture options for DC_71A_n71A are discussed. In the context of the UL configuration restrictions discussed above, the 1PA architecture can provide reasonable DC_71A_n71A performance and can correspond to minimum requirements associated with a 3GPP communication standard.

The 2PA architecture show significantly improved performance and even outperforms LTE and NR SA cases, is more flexible in term of RB allocation and potentially allows for wider aggregation bandwidth and/or non-contiguous LTE and NR channels.

Thus, 1PA architecture with restricted UL configuration can be used to develop minimum requirement, and PA architecture requirement without UL configuration restriction with associated UE capability, larger aggregated BW than 20 MHz or non-contiguous LTE/NR channels is FFS.

The above discussion provides measurements results for a number of DC_71A_n71A cases, corresponding to both single PA/antenna and two PA/antenna architectures.

With respect to power sharing, equal PSD split can be used for collocated intra-band DC.

With respect to UL configuration for REFSENS: (i) for 2 PA architecture, no restriction on RB allocation; and (ii) for 1PA architecture: partial RB allocation is restricted to the lowest frequency position, total RB number is equal to the LTE REFSENS UL configuration corresponding to the same aggregated BW and split between LTE and NR proportionally to their respective channel bandwidths.

Furthermore, with respect to UE architecture, 1PA architecture with restricted UL configuration correspond to minimum requirement for an associated communication standard, and for 2 PA architecture requirement without UL configuration restriction with associated UE capability, larger aggregated BW than 20 MHz or non-contiguous LTE/NR channels is FFS.

Furthermore, as a first observation, 2PA architecture outperforms 1PA architecture for DC_71A_n71 but also outperforms LTE or NR SA for the same aggregated BW and supports any full or partial RB allocations. As a second observation, to enable acceptable 1PA architecture DC_71A_n71 partial allocations positions should be restricted.

In order to progress in the definition of the requirement for DC_41A-n41A high power user equipment (HPUE), this contribution explores a number of scenarios with measurements and compares behavior of both one PA per antenna and two PA per antenna architectures for A-MPR related to NS_04 requirements.

In this section, an extract of N_04 requirements that apply to Band 41 and related PC3 and PC2 A-MPR are provided.

With respect to when "NS 04" is indicated in the cell, the power of any UE emission shall not exceed the levels specified in Table 2. This specification requirement also applies for the frequency ranges that are less than $F_{OOB}$ (MHz) from the edge of the channel bandwidth.

TABLE 2

| Frequency band (MHz) | Channel bandwidth/ Spectrum emission limit (dBm) 5, 10, 15, 20 MHz | Measurement bandwidth |
|---|---|---|
| 2490.5 ≤ f < 2496 | −13 | 1 MHz |
| 0 < f < 2490.5 | −25 | 1 MHz |

With respect to UE maximum output power with additional maximum power reduction (A-MPR), Table 3 is provided below.

TABLE 3

| Network Signaling value | E-UTRA Band | Channel bandwidth (MHz) | Resources Blocks ($N_{RB}$) | A-MPR (dB) |
|---|---|---|---|---|
| NS_04 | 41 | 5, 10, 15, 20 | | Table 4, Table 5 |

Table 4 and Table 5 below provide specified A-MPR for Band 41 PC3 and PC2 cases for single UL carrier.

In particular, Table 4 below provides A-MPR requirements for NS_04 for power class 3 UE. With respect to Table 4, $RB_{start}$ indicates the lowest RB index of transmitted resource blocks. Additionally, $L_{CRB}$ is the length of a contiguous resource block allocation. For intra-subframe frequency hopping which intersects regions, $RB_{start}$ and $L_{CRB}$ apply on a per slot basis. For intra-subframe frequency hopping which intersects regions, the larger A-MPR value may be applied for both slots in the subframe.

TABLE 4

| Channel bandwidth [MHz] | Parameters | | | | | |
|---|---|---|---|---|---|---|
| 5 | Fc [MHz] | | ≤2500.5 | | | >2500.5 |
| | $RB_{start}$ | | 0-8 | | 9-24 | 0-24 |
| | $L_{CRB}$ [RBs] | | >0 | | >0 | >0 |
| | A-MPR [dB] | | ≤2 | | 0 | 0 |
| 10 | Fc [MHz] | | ≤2504 | | | >2504 |
| | $RB_{start}$ | | 0-8 | | 9-35 | 36-49 | 0-49 |
| | $L_{CRB}$ [RBs] | ≤15 | >15 and <25 | ≥25 | N/A | >0 | >0 |
| | $RB_{start}$ + $L_{CRB}$ [RBs] | N/A | N/A | N/A | ≥45 | N/A | N/A |
| | A-MPR [dB] | ≤3 | ≤1 | ≤2 | ≤1 | 0 | 0 |
| 15 | Fc [MHz] | | ≤2510.8 | | | >2510.8 |
| | $RB_{start}$ | | 0-13 | | 14-59 | 60-74 | 0-74 |
| | $L_{CRB}$ [RBs] | ≤18 or ≥36 | >18 and <36 | N/A | >0 | >0 |
| | $RB_{start}$ + $L_{CRB}$ [RBs] | N/A | N/A | ≥62 | N/A | N/A |
| | A-MPR [dB] | ≤3 | ≤1 | ≤1 | 0 | 0 |
| 20 | Fc [MHz] | | ≤2517.5 | | | >2517.5 |
| | $RB_{start}$ | | 0-22 | | 23-76 | 77-99 | 0-99 |
| | $L_{CRB}$ [RBs] | ≤18 or ≥40 | >18 and <40 | N/A | >0 | >0 |
| | $RB_{start}$ + $L_{CRB}$ [RBs] | N/A | N/A | ≥86 | N/A | N/A |
| | A-MPR [dB] | ≤3 | ≤1 | ≤1 | 0 | 0 |

Table 5 provides A-MPR requirements for NS_04 for power class 2 UE. $RB_{start}$ indicates the lowest RB index of transmitted resource blocks. Additionally, $L_{CRB}$ is the length of a contiguous resource block allocation. For intra-subframe frequency hopping which intersects regions, $RB_{start}$ and $L_{CRB}$ apply on a per slot basis. For intra-subframe frequency hopping which intersects regions, the larger A-MPR value may be applied for both slots in the subframe.

TABLE 5

| Channel bandwidth [MHz] | Parameters | | | | | |
|---|---|---|---|---|---|---|
| 5 | Fc [MHz] | | ≤2500.5 | | | >2500.5 |
| | $RB_{start}$ | | 0-8 | | 9-24 | 0-24 |
| | $L_{CRB}$ [RBs] | | >0 | | >0 | >0 |
| | A-MPR [dB] | | ≤3 | | 0 | 0 |
| 10 | Fc [MHz] | | ≤2504 | | | >2504 |
| | $RB_{start}$ | | 0-8 | | 9-35 | 36-49 | 0-49 |
| | $L_{CRB}$ [RBs] | ≤15 | >15 and <25 | ≥25 | N/A | >0 | >0 |
| | $RB_{start}$ + $L_{CRB}$ [RBs] | N/A | N/A | N/A | ≥45 | N/A | N/A |
| | A-MPR [dB] | ≤5 | ≤2 | ≤3 | ≤1 | 0 | 0 |
| 15 | Fc [MHz] | | ≤2510.8 | | | >2510.8 |
| | $RB_{start}$ | | 0-13 | | 14-59 | 60-74 | 0-74 |
| | $L_{CRB}$ [RBs] | ≤18 | >18 and <36 | ≥36 | N/A | >0 | >0 |
| | $RB_{start}$ + $L_{CRB}$ [RBs] | N/A | N/A | N/A | ≥62 | N/A | N/A |
| | A-MPR [dB] | ≤5 | ≤2 | ≤4 | ≤3 | 0 | 0 |
| 20 | Fc [MHz] | | ≤2517.5 | | | >2517.5 |
| | $RB_{start}$ | | 0-22 | | 23-76 | 77-99 | 0-99 |
| | $L_{CRB}$ [RBs] | ≤18 | >18 and <40 | ≥40 | N/A | >0 | >0 |
| | $RB_{start}$ + $L_{CRB}$ [RBs] | N/A | N/A | N/A | ≥86 | N/A | N/A |
| | A-MPR [dB] | ≤5 | ≤2 | ≤4 | ≤3 | 0 | 0 |

It is to be noted that although PC2 should provide 3 dB higher output power, for the cases with A-MPR there is 2 dB more than for the PC3 cases, offsetting most of the power class difference. For this single UL carrier LTE case, the issue is confined to a lower frequency depending on channel bandwidth and using some RB allocation restrictions, A-MPR can be avoided.

For DC_41A_n41A non-contiguous cases however, IMD3/IMD5 products can fall into both NS_04 ranges for many positions of the two carriers across the whole band. This may result into so many A-MPR cases that DC_41A_n41A HPUE becomes useless. In this section, IMD products are studied for both single and dual antenna architectures.

As one observation, non-contiguous DC_41A_n41A IMD products may use relatively significant A-MPR related to NS_04 to the point that single PA/antenna HPUE makes no sense. It is to be noted that IMD product will also fall into BT/Wi-Fi 2.4 GHz band and cause in-device coexistence issues.

Single PA/Antenna Architecture and Signals

Single PA/antenna architecture and signal flow is shown in FIG. 6A. The LTE and NR signals are fed into a single PA and through the PA non-linearity generates IMD products that fall into the NS_04 protected frequency ranges potentially requiring significant A-MPR. In these calculations, a 4 dB post PA loss assumption and PA operating point was chosen for 30 dBc EUTRA ACLR for PC3, and all levels are 3 dB higher for PC2 and 6 dB higher for 29 dBm HPUE. Additionally, equal power sharing was used, but believe that equal PSD is more appropriate for intra-band DC with collocated sites. IMD products are dominated by PA forward IMD performance.

Two PA/Antenna Architecture and Signals

Two PA/antenna architecture and signal flow is shown in FIG. 6B, and includes LTE and NR signals are separately fed into each PA/antenna path at equal power for simplicity, but equal PSD may be more appropriate for intra-band DC with collocated sites.

In this case, the IMD products falling into the NS_04 frequency ranges are significantly reduced as the signal from the other path is only seen by the dedicated PA via two mechanisms: (i) via PCB leakage but then the unwanted signal is 39 dB lower than the wanted signal (versus 0 dBc in the one PA/antenna case) resulting in very low IMD products; and (ii) via antenna coupling and the unwanted signal is seen as a reverse signal at 18 dB lower power than the wanted forward signal.

Again, low IMD products are generated since the PA has 3 dB higher back-off, reverse IP3 is higher and unwanted signal is lower. Although passive front-end components provide IMD contributions, these are typically much lower than the PA forward IMD products.

In these measurements, a 4 dB post PA loss assumption and PA operating point was chosen for 30 dBc EUTRA ACLR for PC3 and all levels are 3 dB higher for PC2 and 6 dB higher for 29 dBm HPUE. In this case, IMD products falling into NS_04 frequency range are dominated by the PA reverse non-linearity and passive front-end non-linearity. Thus, the PA measurements are believed to be representative of the overall behavior of the differences in architecture.

IMD Calculations and Compliance to NS_04

Initially, the following discussion is with respect to the single PA/antenna architecture discussed above.

Using calculations for PC2 HPUE PA forward IMD: (i) PA OIP3=45 dBm and OIP5=37 dBm; (ii) Post PA losses of 4 dB=>forward tones at PA output=27 dBm each; (iii) IMD3 level at −9 dBm and IMD5 level at −13 dBm at PA output thus −11 dBm and −17 dBm equivalent level at the antenna; and (iv) for PC3 this tones will only be 3 dB lower.

Assuming that LTE and NR carriers could have 1 MHz equivalent allocation, both IMD3 and 5 products would significant fail the −25 dBm/MHz requirement in frequency region where the B41 filter will not provide significant attenuation. This is also true for PC3 case. Similarly the −13 dBm/MHz limit just below B41 can be failed by IMD3.

Accordingly, significant A-MPR is required for single PA/antenna architecture due to dual UL IMD levels, and that even for PC3.

Next, the following discussion is with respect to the two PA/Antenna architecture.

PA reverse IMD3/5 products are very low at <60 dBm as observed from reverse IMD measurements. Additionally, leakage paths can be ignored as demonstrated above. Furthermore, switch related IMD3 levels are relatively low.

Even for a 26 dBm+26 dBm (29 dBm power class) case, the IMD levels meet NS-04 requirements. These low IMD levels will also enable good in-device coexistence with 2.4 GHz ISM band.

Thus, LTE A-MPR principle is applicable to two PA/antenna architecture and no extra A-MPR is required due to dual UL IMD levels even for a 29 dBm power class.

As a first observation, two PA/antenna architecture outperforms one/PA architecture for DC_41A_n41. LTE A-MPR principle is applicable in a restricted number of cases and no extra A-MPR is required due to dual UL IMD levels is needed to meet NS_04 requirement, even for a 29 dBm power class.

As a second observation, one PA/antenna architecture DC_41A_n41 requires significant A-MPR due to dual UL IMD levels even for PC3 across the entire band, making HPUE support questionable for this architecture.

As a third observation, both architectures have similar behavior for IMD products falling into 2.4 GHz ISM band, making the two PA/antenna architecture more robust for in-device coexistence.

Comments on DC_41A_n41A

Initial comments are provided with respect to power sharing.

Although equal power for each carrier has been used for these intra-band dual connectivity cases, the scenario is for a co-located LTE and NR base station, and in this case power per RB should be very similar for LTE and NR thus correspond to an equal PSD case.

Thus, equal PSD split can be used for co-located intra-band DC.

The two PA architecture shows significantly improved performance for NS_04 compliance and in-device coexistence even at the high output powers required for a 29 dBm power class. Since this two PA/antenna architecture is de facto available for 2×2 MIMO.

One PA/antenna architecture will suffer from significant A-MPR to meet NS_04 requirement and in certain implementations is used for PC3 operation.

Accordingly, for UE architecture: (i) one PA/antenna architecture can be used to develop A-MPR minimum requirement for PC3 only; and (ii) two PA/antenna architecture NS_04 requirement can be developed for DC_71A_n71 HPUE. No UE capability is required for UEs already supporting 2×2 UL MIMO.

The above discussion provides a study of DC_41A_n41A IMD behavior, thereby providing insight with respect to the development of the NS_04 related minimum requirement for both single PA/antenna and two PA/antenna architectures.

With respect to power sharing, equal PSD split can be used for co-located intra-band DC. Additionally, with respect to UE architecture: (i) one PA/antenna architecture can be used to develop A-MPR minimum requirement for PC3 only; and (ii) two PA/antenna architecture NS_04 requirement is developed for DC_71A_n71 HPUE. No UE capability is required for UEs already supporting 2×2 UL MIMO.

One observation from the measurements is that two PA/antenna architecture outperforms one PA architecture for DC_41A_n41. LTE A-MPR principle is applicable in a restricted number of cases and no extra A-MPR is required due to dual UL IMD levels is needed to meet NS_04 requirement, even for a 29 dBm power class.

A second observation is that one PA/antenna architecture DC_41A_n41 requires significant A-MPR due to dual UL IMD levels even for PC3 across the entire band.

A third observation is that both architectures have similar behavior for IMD products falling into 2.4 GHz ISM band, making the two PA/antenna architecture more robust for in-device coexistence.

Dynamic Control of Single Switched Uplink Versus Multi Uplink

In certain embodiments herein, a mobile device or other user equipment (UE) includes a front end system including a first transmit chain coupled to a first antenna and a second transmit chain coupled to a second antenna. The mobile device further includes a transceiver that transmits a first type of RF signal and a second type of RF signal by way of the front end system. The transceiver is operable in a first mode in which transmissions of the first type of RF signal and the second type of RF signal are staggered over time (for instance, alternated), and a second mode in which transmissions of the first type of RF signal and the second type of RF signal at least partially overlap in time. The transceiver includes a transmit control circuit that operates the transceiver in the first mode or the second mode based on a comparison of a transmit parameter to a threshold.

The transmit control circuit can control the selected mode of operation of the transceiver based on a variety of thresholds. In a first example, the transmit parameter is signal sensitivity and the threshold is a sensitivity threshold, such as maximum sensitivity degradation (MSD). In a second example, the transmit parameter is power reduction and the threshold is a power reduction threshold, such as additional maximum power reduction (A-MPR).

By implementing the mobile device or other UE in this manner, enhanced performance is achieved. For example, the UE is best positioned to detect issues arising from operating in the second mode from either power sharing, failing emissions (A-MPR), or MSD.

Figure 7A:
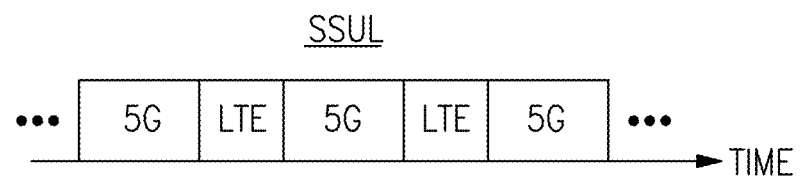
FIG. 7A is a schematic diagram of an example of single switched uplink (SSUL).

FIG. 7A is a schematic diagram of an example of single switched uplink (SSUL).

In certain implementations, an RF communication system switches between one type of uplink transmission versus another type of uplink transmission. For example, the RF communication system can switch between 4G LTE transmissions and 5G transmissions over time such that the transmissions are non-overlapping.

In the example shown in FIG. 7A, 5G and LTE transmission are alternated in time based on scheduled transmit time slots. Although an example with alternation is shown, other types of switching are possible. Furthermore, although an example of switching between 5G and LTE transmissions is shown, other types of communication types can use SSUL. Furthermore, the time slots for transmissions can be of different durations or lengths, which need not be the same for each slot.

Operating an RF communication system using SSUL can provide a number of benefits, such as lower total transmit power to comply with emissions limitations and/or constraints on intermodulation. However, operating using SSUL can reduce bandwidth.

Figure 7B:
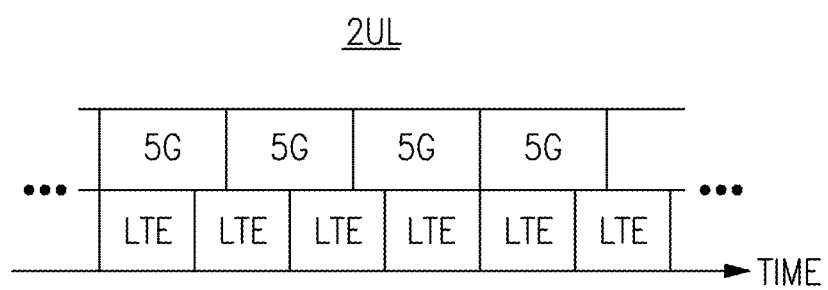
FIG. 7B is a schematic diagram of an example of dual uplink (2UL).

FIG. 7B is a schematic diagram of an example of dual uplink (2UL).

In certain implementations, an RF communication system transmits one type of uplink transmission and another type of uplink transmission at least partially overlapping in time. For example, the RF communication system can simultaneously transmit 4G LTE transmissions and 5G transmissions.

Although an example of 2UL using 5G and LTE transmissions is shown, other types of communication types can use 2UL.

Figure 8A:
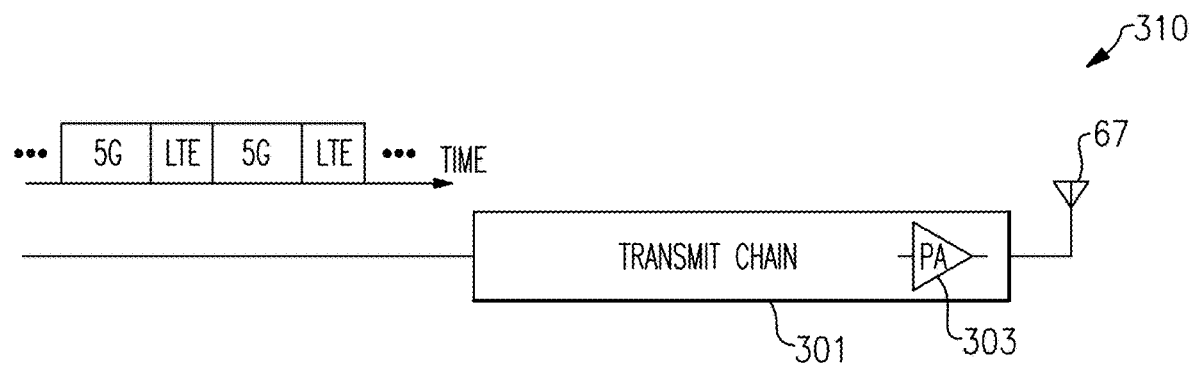
FIG. 8A is a schematic diagram of one embodiment of an RF communication system operating using SSUL.

FIG. 8A is a schematic diagram of one embodiment of an RF communication system 310 operating using SSUL. The RF communication system 310 includes an antenna 67 and a transmit chain 301 including a power amplifier 303.

As shown in FIG. 8A, the RF communication system 310 amplifies an RF input signal that switches between 5G and 4G LTE signal type over time.

Figure 8B:
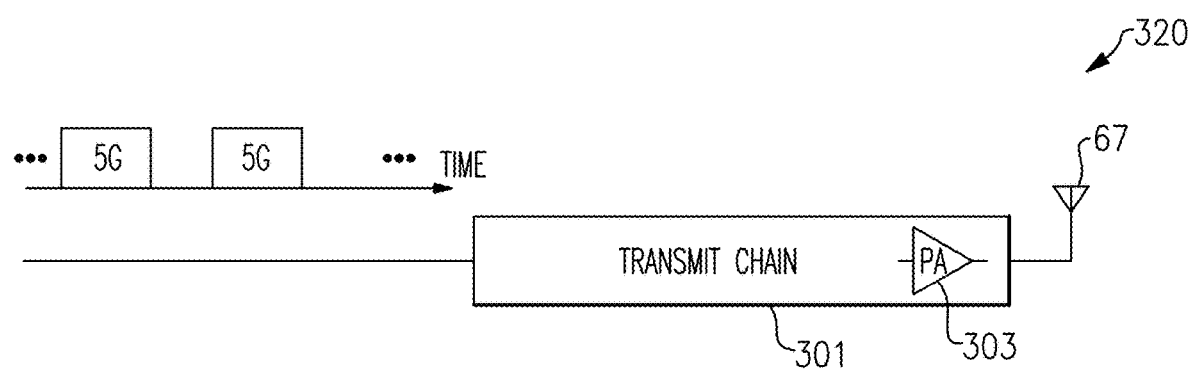
FIG. 8B is a schematic diagram of another embodiment of an RF communication system operating using SSUL.
Figure 8B:
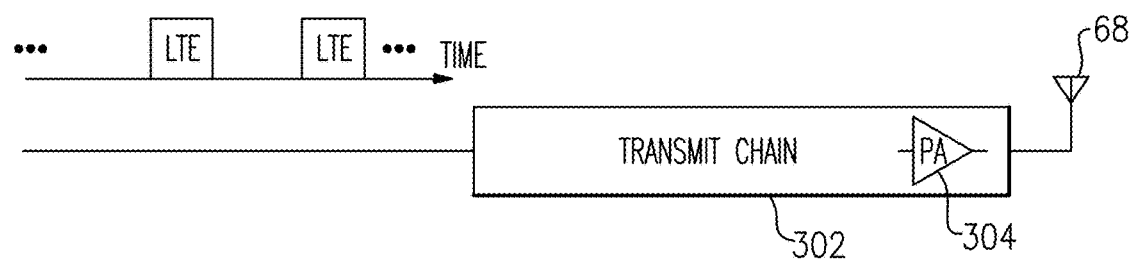

FIG. 8B is a schematic diagram of another embodiment of an RF communication system 320 operating using SSUL. The RF communication system 320 includes a first antenna 67, a second antenna 68, a first transmit chain 301, and a second transmit chain 302. The first transmit chain 301 includes a first power amplifier 303, which provides a 5G amplified RF signal for transmission on the first antenna 67. Additionally, the second transmit chain 302 includes a second power amplifier 304, which provides a 4G LTE amplified RF signal for transmission on the second antenna 68.

In the illustrated embodiment, the transmissions from the first transmit chain 301 and the second transmit chain 302 are staggered in time. When transmitting, the first chain 301 amplifies a 5G RF signal. Additionally, the second transmit chain 302 amplifies a 4G LTE signal when transmitting.

Thus, in contrast to the RF communication system 310 of FIG. 8A that operates with SSUL using a single transmit chain/power amplifier, the RF communication system 320 of FIG. 8B operates with SSUL using separate transmit chains/power amplifiers.

Figure 9A:
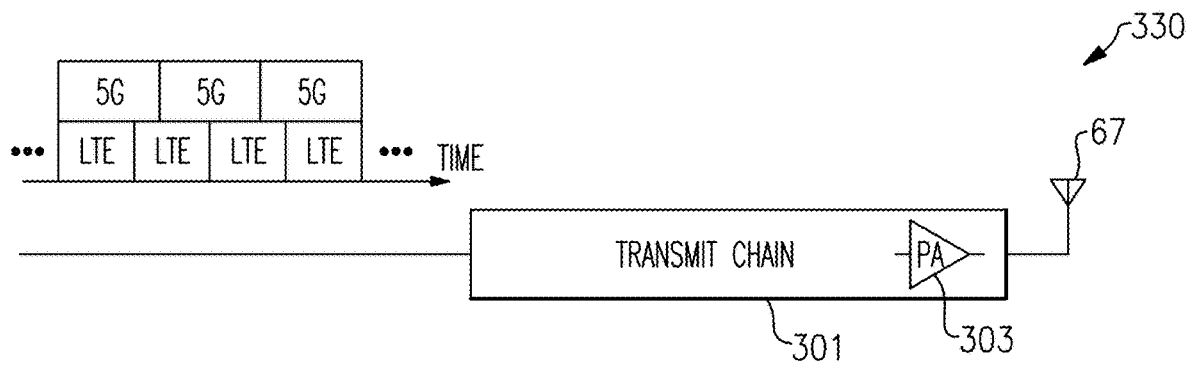
FIG. 9A is a schematic diagram of one embodiment of an RF communication system operating using 2UL.

FIG. 9A is a schematic diagram of one embodiment of an RF communication system 330 operating using 2UL. The RF communication system 330 includes an antenna 67 and a transmit chain 301 including a power amplifier 303.

As shown in FIG. 9A, the RF communication system 330 amplifies an RF input signal that carries both 5G and LTE signal components.

Figure 9B:
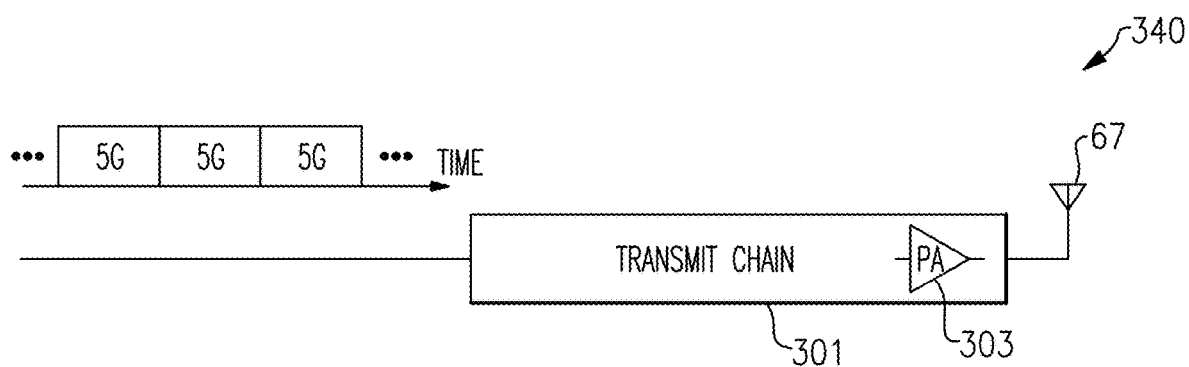
FIG. 9B is a schematic diagram of another embodiment of an RF communication system operating using 2UL.
Figure 9B:
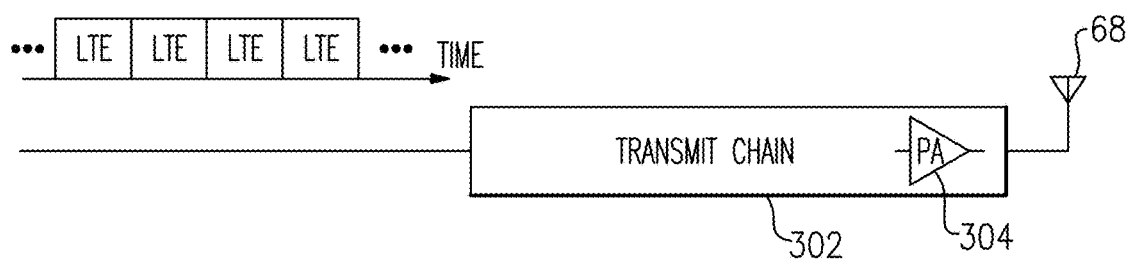

FIG. 9B is a schematic diagram of another embodiment of an RF communication system 340 operating using 2UL. The RF communication system 340 includes a first antenna 67, a second antenna 68, a first transmit chain 301, and a second transmit chain 302. The first transmit chain 301 amplifies a 5G RF signal and the second transmit chain 302 amplifies a 4G LTE signal. For example, the first transmit chain 301 includes a first power amplifier 303, which provides a 5G amplified RF signal for transmission on the first antenna 67. Additionally, the second transmit chain 302 includes a second power amplifier 304, which provides a 4G LTE amplified RF signal for transmission on the second antenna 68.

In the illustrated embodiment, the transmissions from the first transmit chain 301 and the second transmit chain 302 are at least partially overlapping in time, for instance, at least a portion of the 4G LTE transmissions are simultaneous with 5G transmissions.

Thus, in contrast to the RF communication system 330 of FIG. 9A that operates with 2UL using a single transmit chain/power amplifier, the RF communication system 340 of FIG. 9B operates with 2UL using separate transmit chains/power amplifiers.

Figure 10:
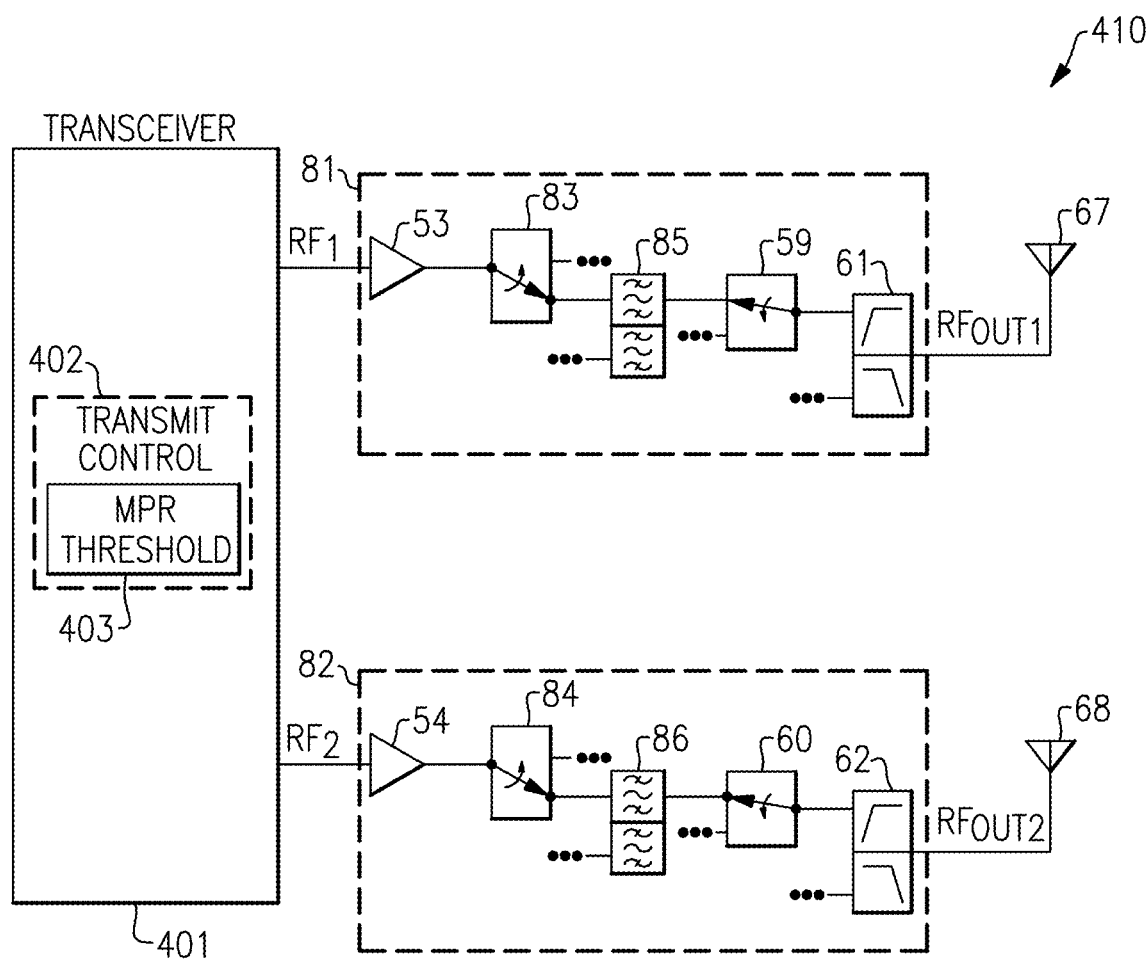
FIG. 10 is a schematic diagram of one embodiment of an RF communication system with dynamic switching between SSUL and 2UL based on a threshold.

FIG. 10 is a schematic diagram of one embodiment of an RF communication system 410 with dynamic switching between SSUL and 2UL based on a threshold. The RF communication system 410 includes a first antenna 67, a second antenna 68, a first transmit chain 81, a second transmit chain 82, and a transceiver 401.

In the illustrated embodiment, the transceiver 401 includes a transmit control circuit 402 that controls dynamic switching between SSUL and 2UL based on a maximum power reduction (MPR) threshold, such as an additional MPR (A-MPR) threshold. Thus, a decision to operate in SSUL or 2UL is chosen based on whether MPR is above or below the MPR threshold 401.

When operating using SSUL, transmission can be switched through one of the transmit chains 81 or 82 (for instance, alternated through one transmit chain as in FIG. 8A) or switched between transmit chains 81 and 82 (for instance, alternated between to transmit chains as in FIG. 8B).

When operating using 2UL, transmission can be through one of the transmit chains 81 or 82 (for instance, as in FIG. 9A) or through both transmit chains 81 and 82 (for instance, as in FIG. 9B).

In certain implementations, the signal content of the first type of transmission (for instance, 5G) and the signal content of the second type of transmission (for instance, 4G LTE) are relatively close in frequency (for instance, intra-band), and the decision to operate 2UL using one of the transmit chains 81 or 82 (for instance, as in FIG. 9A) or through both transmit chains 81 and 82 (for instance, as in FIG. 9B) is selected based on the power threshold 70, as was described above with respect to FIGS. 2-5.

Accordingly, a transmit control circuit can control transmission between SSUL and 2UL based on a first threshold (for instance, an MPR and/or MSD threshold) and control selection of 2UL transmissions through one or multiple transmit chains based on a second threshold (for instance, a power threshold).

In certain implementations, the SSUL and 2UL modes of the RF communication system 410 are associated with 4G LTE and 5G signal types.

In a first example, the RF communication system 410 operates using inter-band LTE in low band (LB) and 5G NR in mid band (MB). For instance, when operating using SSUL, the RF communication system 410 can alternate between transmitting 4G LTE LB through the transmit chain 81 and transmitting 5G NR MB communications through the transmit chain 82. Additionally, when operating using 2UL, the RF communication system 410 can simultaneously transmit 4G LTE LB through the transmit chain 81 and transmit 5G NR MB communications through the transmit chain 82.

In a second example, the RF communication system operates using inter-band LTE and 5G. When operating in SSUL, a single transmit chain (81 or 82) can be used to alternate between LTE and 5G transmissions or the RF communication system can alternate between transmitting LTE using the transmit chain 81 and transmitting 5G using the transmit chain 82. When operating using 2UL, the transmit chains 81, 82 can transmit LTE and 5G, respectively, or one of the transmit chains can simultaneously amplify an RF signal including an LTE and 5G component (for instance, when LTE and 5G are adjacent frequency channels). In certain implementations, the decision to switch between using one or two transmit chains is dynamically controlled based on a power threshold. For instance, when power is below the power threshold, the RF communication system can transmit using a single transmit chain rather than two transmit chains.

Figure 11:
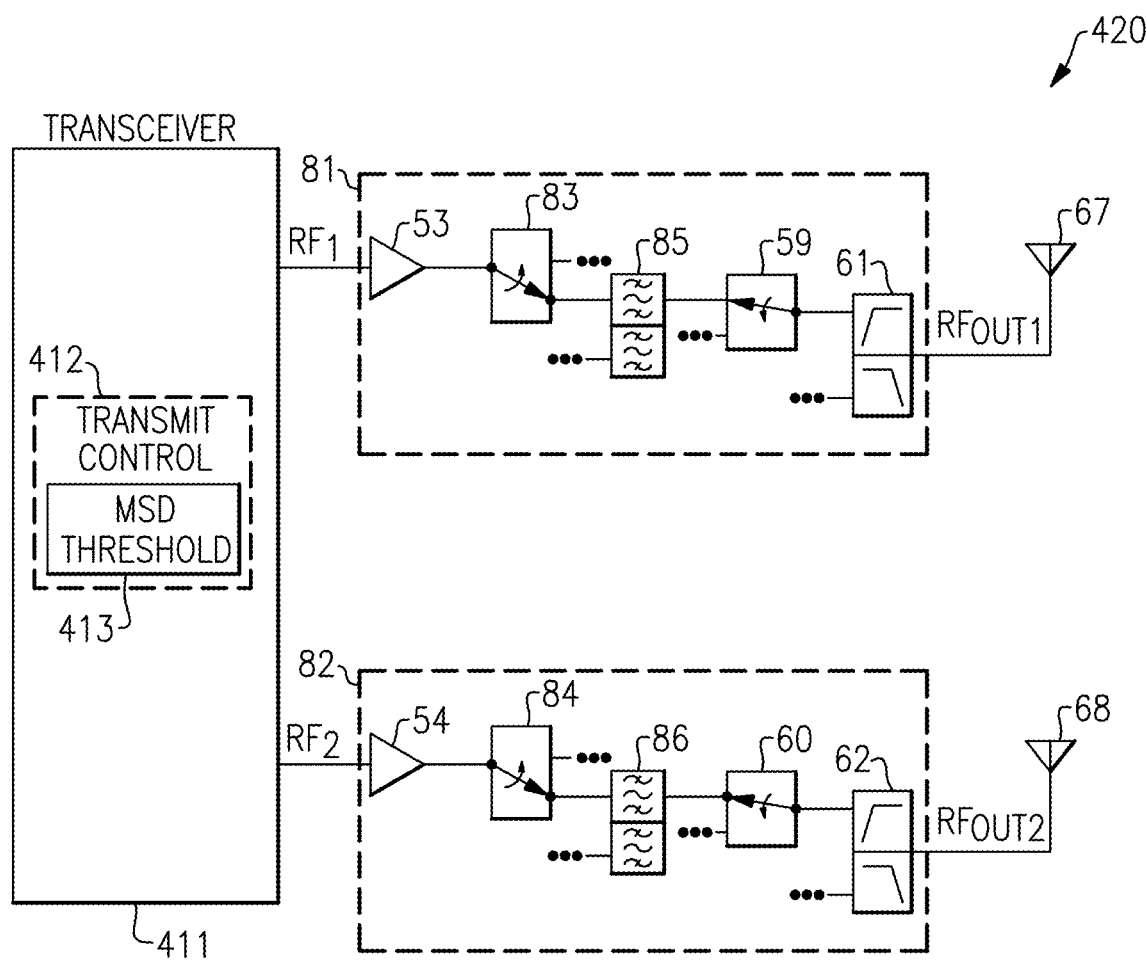
FIG. 11 is a schematic diagram of another embodiment of an RF communication system with dynamic switching between SSUL and 2UL based on a threshold.

FIG. 11 is a schematic diagram of another embodiment of an RF communication system 420 with dynamic switching between SSUL and 2UL based on a threshold.

The RF communication system 420 of FIG. 11 is similar to the RF communication system 410 of FIG. 10, except that the RF communication system 420 includes a transceiver 411 including a transmit control circuit 412 that dynamically switches between SSUL and 2UL based on an MSD threshold 413.

Figure 12:
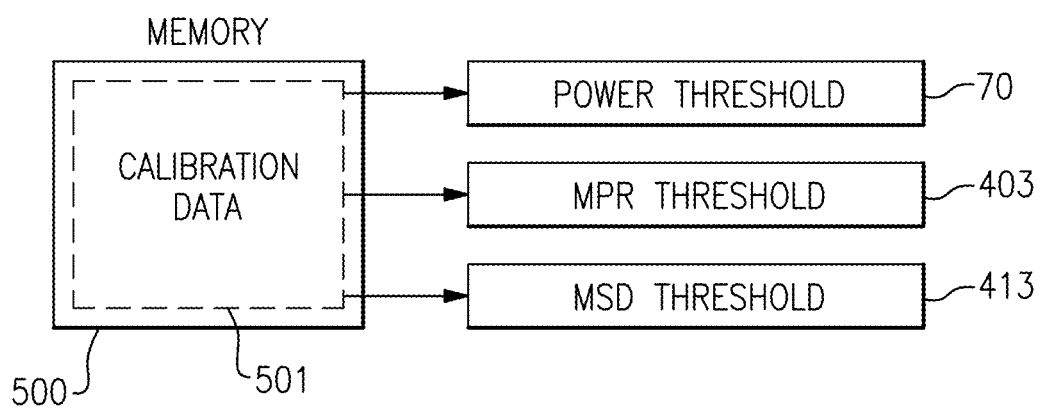
FIG. 12 is a schematic diagram of one embodiment of thresholds based on calibration data.

FIG. 12 is a schematic diagram of one embodiment of thresholds based on calibration data. As shown in FIG. 12, a memory 500 of UE includes calibration data 501 uses to control the level of at least one of a power threshold 70, an MPR threshold 403, or an MSD threshold 413.

Thus, rather that operating using one or more thresholds based on a worse case standardization number, the UE operates using one or more calibrated thresholds.

In one example, UE undergoes emissions testing for MSD, and the MSD threshold 403 is selected based on the results of the emissions testing. For instance, a standard may allow for up to 20 dB MSD, while compliance can be achieved for a particular UE at a lower number, for instance, 5 dB.

In certain implementations herein, SSUL supplements 2UL operation to facility full cell EN-DC coverage, particularly for combinations with significant MSD or requiring MPR.

Example Analysis of SSUL Operation versus 2UL Operation

In Table 6 below, certain EN-DC combinations of 5G Release 15 related to SSUL operation are provided. Beyond the cases that meet the criteria defined in RAN4 for difficult band combinations, there are other cases, such as intra-band EN-DC cases, where SSUL is permitted to mitigate solve IMD related emissions or MSD issues.

TABLE 6

| EN-DC band | Single UL allowed | Comment |
| --- | --- | --- |
| DC_(n)71 | No | For UE(s) supporting dynamic power sharing dual simultaneous UL is used. For UE(s) not supporting dynamic power sharing single UL is allowed. |
| DC_(n)41 | Yes | Single UL allowed due to potential emission issues, not self-interference. |

TABLE 6-continued

| EN-DC band | Single UL allowed | Comment |
|---|---|---|
| DC_3_n3 | Yes | Single switched UL is supported in Rel.15 (no MSD/A-MPR specified) |
| DC_41_n41 | Yes | Single UL allowed due to potential emission issues, not self-interference |
| DC_1_n77 | DC_1_n77 | IMD2 falling on LTE primary cell |
| DC_2_n66 | No DC_2_n66 | IMD3 with H-H combination falling on LTE primary cell |
| DC_2_n78 | No DC_2_n78 | IMD2 falling on LTE primary cell |
| DC_3_n77 | DC_3_n77 | IMD2 falling on LTE primary cell |
| DC_3_n78 | DC_3_n78 | IMD2 falling on LTE primary cell |
| DC_5_n66 | No DC_5_n66 | IMD2 falling on LTE primary cell |
| DC_20_n8 | No DC_20_n8 | IMD3 with L-L combination falling on LTE primary cell |
| DC_28_n51 | No | Only DC_28A-n50 has SSUL |
| DC_66_n78 | No DC_66_n78 | IMD2 falling on LTE primary cell |

On top of these cases where SSUL is allowed, there are other cases which, although not meeting RAN4 "SSUL allowed" criteria, have significant MSD related to 2UL operation.

Figure 13:
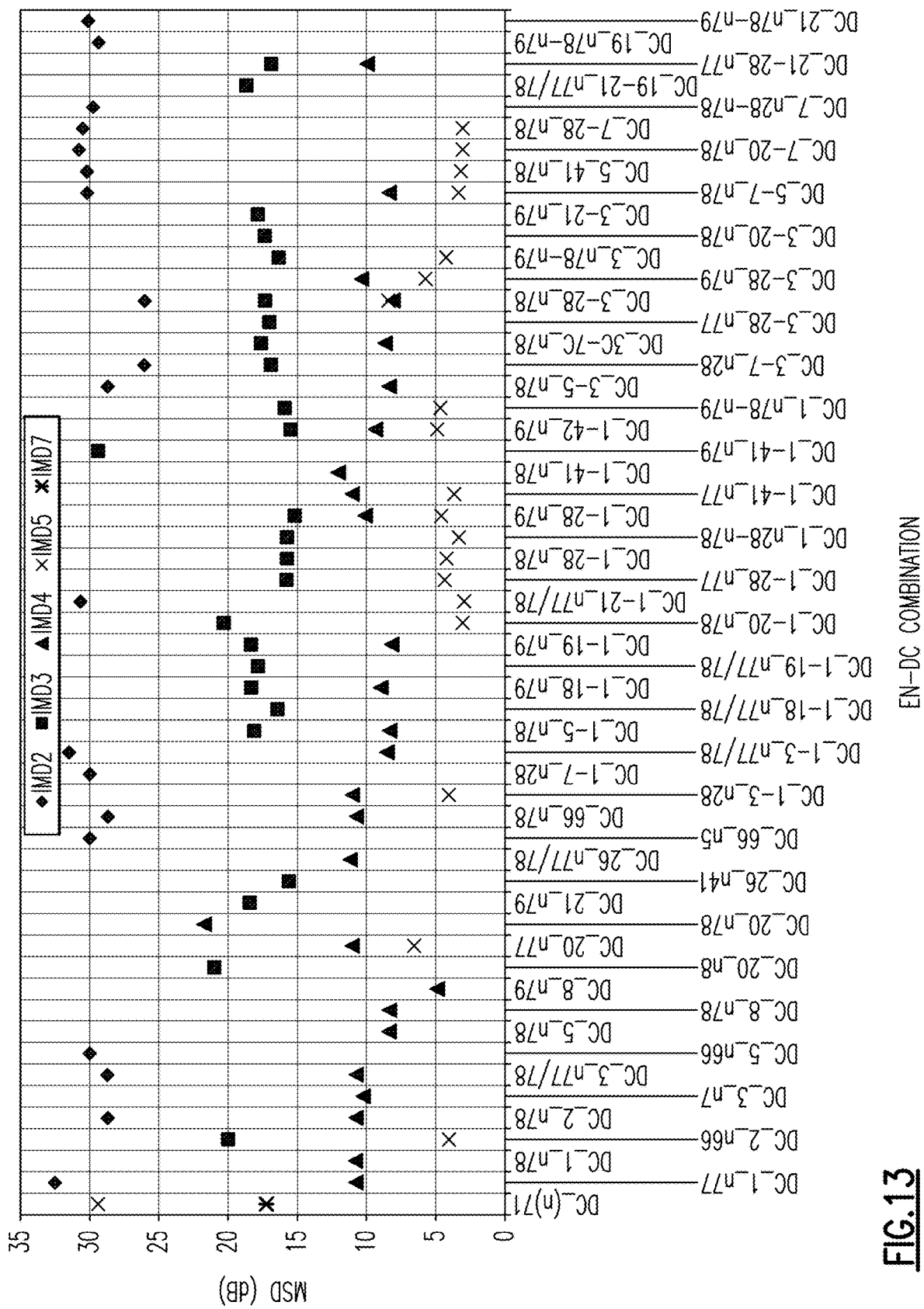
FIG. 13 illustrates example plots of maximum sensitive degradation (MSD) in relation to intermodulation distortion (IMD) order.

FIG. 13 illustrates example plots of MSD in relation to IMD order. The plots are depicted for various two band and three band EN-DC combinations.

Separately the intra-band EN-DC combinations also suffer from significant A-MPR in the range of 10-15 dB for some allocations.

It should be noted that some TDD/TDD combinations may also use A-MPR due to IMDs products failing emissions requirements, for instance, for cases where filtering is limited. A few examples are associated with Band 41, 42, n77/78 and n79: (i) 2UL EN-DC involving Band 41 and Band n77/78 have IMD3 products in Bands n77 and n79; (ii) 2UL EN-DC involving Band 42 and n79 have IMD3 products in Bands 41 and Band 46; and (iii) 2UL EN-DC involving Band 42 and n77 have IMD3 products in Bands n79.

One of the initial benefits of UE dynamic switching is that for difficult bands it would enable the UE to support 2UL at lower output powers rather than operating in SSUL in the whole cell.

Second, it would allow combinations with large MSD or A-MPR to maintain an EN-DC connection up to cell edge in SSUL mode and still support 2UL at lower powers.

Finally, even for EN-DC cases without MSD or A-MPR issues, power sharing can result in NR link being dropped thus not allowing EN-DC link to be maintained at cell edge, switching to SSUL mode rather than dropping NR would be beneficial.

Accordingly, supporting 2UL within the cell then switching to SSUL at cell edge or at high MSD or A-MPR benefits to all EN-DC scenarios.

Support of 2UL in the cell and switching to SSUL at cell edge or at high MSD or A-MPR can be implemented in a wide variety of ways. In a first example, switching is controlled by the UE (for instance, by signaling SSUL being needed). In a second example, switching is controlled by the network (for instance, via scheduling).

On the threshold aspects, the UE is the best positioned to know when issues arise from 2UL from either power sharing, failing emissions (A-MPR), or MSD. It could also signal the need to switch to SSUL at the exact performance of that particular UE rather than potentially increase the A-MPR or MSD from the specification. In certain implementations, UE signaling to the network is put used to flag SSUL needed or to report a power threshold at which SSUL scheduling is expected.

Thus, EN-DC cell coverage can be improved by dynamically switching between 2UL and SSUL not only in cases where high MSD or A-MPR are present, but also to avoid the drop of NR at cell edge due to power sharing.

Example Radio Frequency Module and Example Mobile Device

Figure 14A:
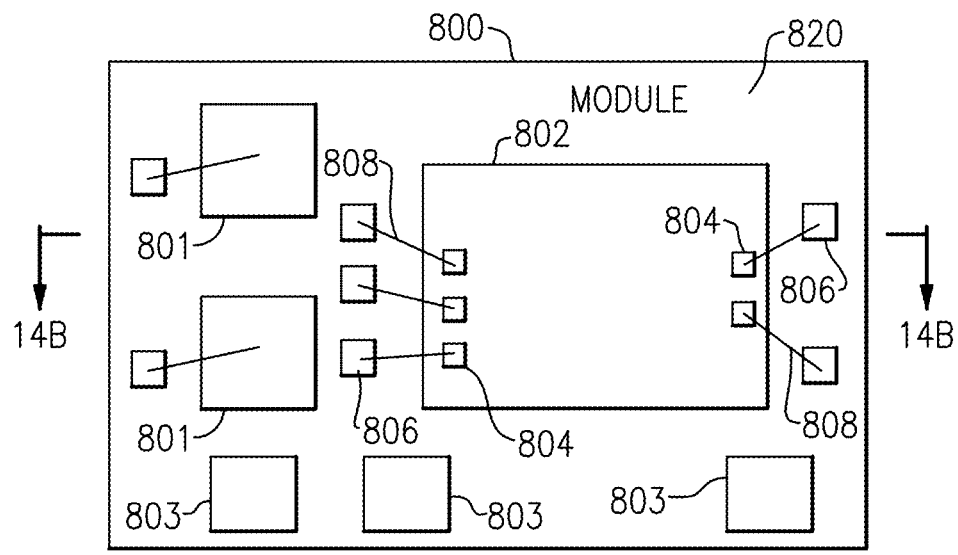
FIG. 14A is a schematic diagram of one embodiment of a packaged module.
Figure 14B:
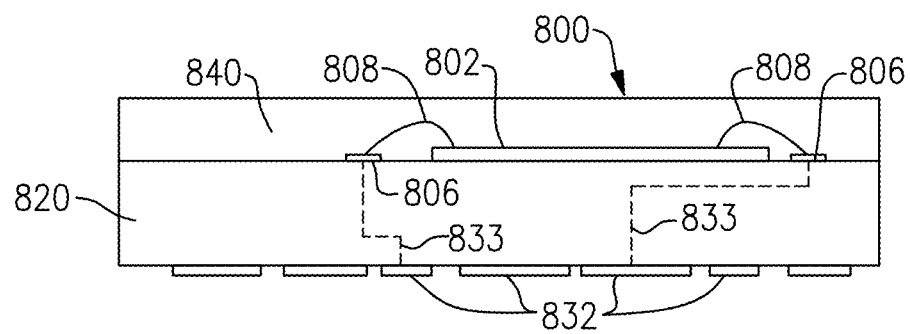
FIG. 14B is a schematic diagram of a cross-section of the packaged module of FIG. 14A taken along the lines 14B-14B.

FIG. 14A is a schematic diagram of one embodiment of a packaged module 800. FIG. 14B is a schematic diagram of a cross-section of the packaged module 800 of FIG. 14A taken along the lines 14B-14B.

Certain implementations of the RF communication systems herein include one or more packaged modules, such as the packaged module 800. For example, one or more transmit chains can be implemented on the packaged module 800. Although the packaged module 800 of FIGS. 14A and 14B illustrates one example implementation of a module suitable for use in an RF communication system, other implementations of modules are possible.

The packaged module 800 includes radio frequency components 801, a semiconductor die 802, surface mount devices 803, wirebonds 808, a package substrate 820, and encapsulation structure 840. The package substrate 820 includes pads 806 formed from conductors disposed therein. Additionally, the semiconductor die 802 includes pins or pads 804, and the wirebonds 808 have been used to connect the pads 804 of the die 802 to the pads 806 of the package substrate 820.

As shown in FIG. 14B, the packaged module 800 is shown to include a plurality of contact pads 832 disposed on the side of the packaged module 800 opposite the side used to mount the semiconductor die 802. Configuring the packaged module 800 in this manner can aid in connecting the packaged module 800 to a circuit board, such as a phone board of a wireless device. The example contact pads 832 can be configured to provide radio frequency signals, bias signals, and/or power (for example, a power supply voltage and ground) to the semiconductor die 802. As shown in FIG. 14B, the electrical connections between the contact pads 832 and the semiconductor die 802 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling. Such a packaging structure can include overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip-chip configurations.

Figure 15:
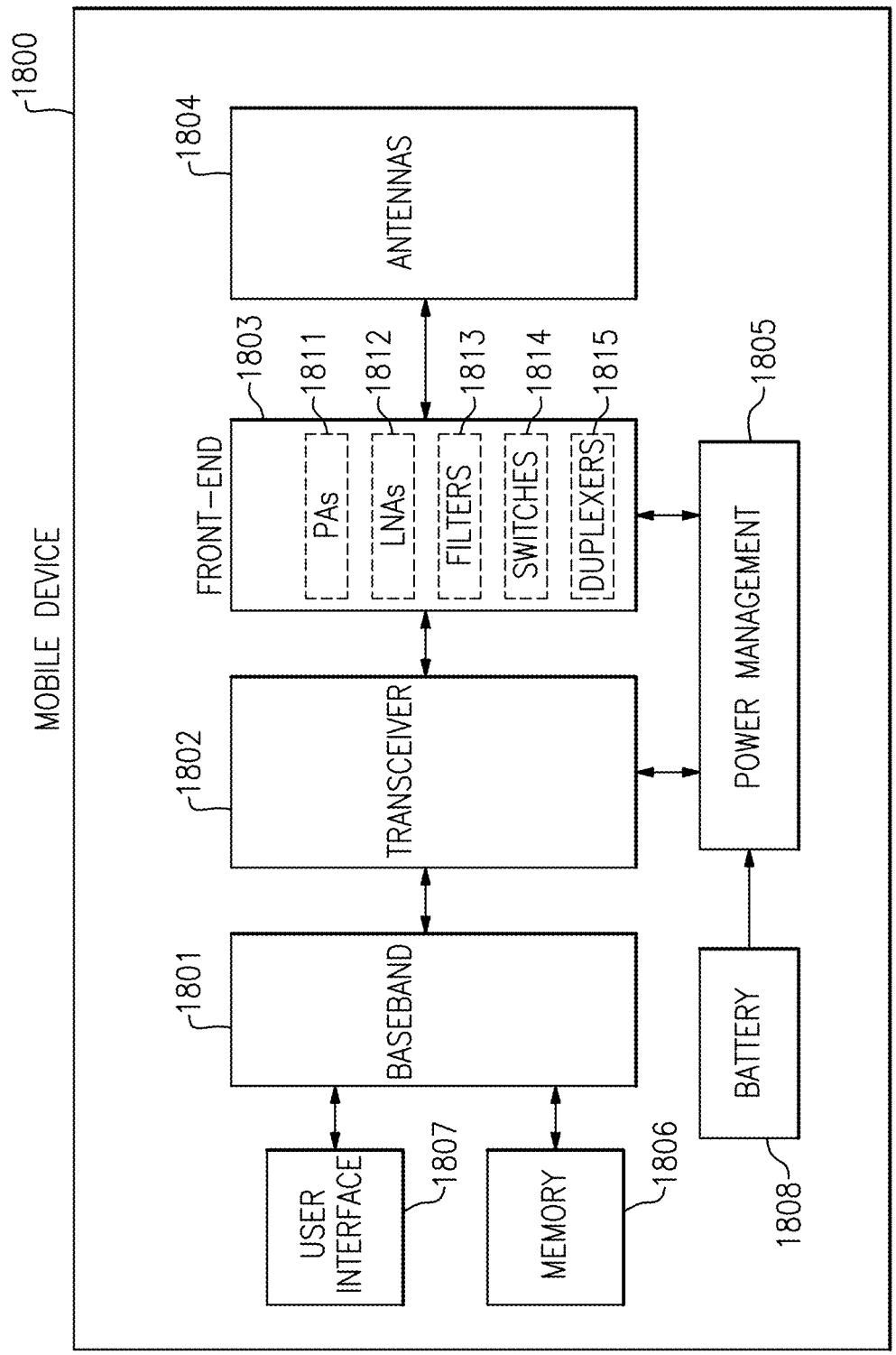
FIG. 15 is a schematic diagram of one embodiment of a mobile device.

FIG. 15 is a schematic diagram of one embodiment of a mobile device 1800. The mobile device 1800 includes a baseband system 1801, a transceiver 1802, a front-end system 1803, antennas 1804, a power management system 1805, a memory 1806, a user interface 1807, and a battery 1808.

The mobile device 1800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 1802 generates RF signals for transmission and processes incoming RF signals received from the antennas 1804. It will be understood that various functionalities associated with the transmission and receiving of RF signals can be achieved by one or more components that are collectively represented in FIG. 15 as the transceiver 1802. In one example, separate components (for instance, separate circuits or dies) can be provided for handling certain types of RF signals.

The front-end system 1803 aids is conditioning signals transmitted to and/or received from the antennas 1804. In the illustrated embodiment, the front-end system 1803 includes power amplifiers (PAs) 1811, low noise amplifiers (LNAs) 1812, filters 1813, switches 1814, and duplexers 1815. However, other implementations are possible.

For example, the front-end system 1803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

The mobile device 1800 is implemented using one or more features disclosed herein. For example, the transceiver 1802 can partition a modulated signal into two or more RF signals for transmission on two or more of the antennas 1804 via separate transmit chains of the front-end system 1803.

In certain implementations, the mobile device 1800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 1804 can include antennas used for a wide variety of types of communications. For example, the antennas 1804 can include antennas for transmitting and/or receiving signals associated with a wide variety of frequencies and communications standards.

In certain implementations, the antennas 1804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 1800 can operate with beamforming in certain implementations. For example, the front-end system 1803 can include phase shifters having variable phase controlled by the transceiver 1802. Additionally, the phase shifters are controlled to provide beam formation and directivity for transmission and/or reception of signals using the antennas 1804. For example, in the context of signal transmission, the phases of the transmit signals provided to the antennas 1804 are controlled such that radiated signals from the antennas 1804 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 1804 from a particular direction. In certain implementations, the antennas 1804 include one or more arrays of antenna elements to enhance beamforming.

The baseband system 1801 is coupled to the user interface 1807 to facilitate processing of various user input and output (I/O), such as voice and data. The baseband system 1801 provides the transceiver 1802 with digital representations of transmit signals, which the transceiver 1802 processes to generate RF signals for transmission. The baseband system 1801 also processes digital representations of received signals provided by the transceiver 1802. As shown in FIG. 15, the baseband system 1801 is coupled to the memory 1806 of facilitate operation of the mobile device 1800.

The memory 1806 can be used for a wide variety of purposes, such as storing data and/or instructions to facilitate the operation of the mobile device 1800 and/or to provide storage of user information.

The power management system 1805 provides a number of power management functions of the mobile device 1800. In certain implementations, the power management system 1805 includes a PA supply control circuit that controls the supply voltages of the power amplifiers 1811. For example, the power management system 1805 can be configured to change the supply voltage(s) provided to one or more of the power amplifiers 1811 to improve efficiency, such as power added efficiency (PAE).

As shown in FIG. 15, the power management system 1805 receives a battery voltage from the battery 1808. The battery 1808 can be any suitable battery for use in the mobile device 1800, including, for example, a lithium-ion battery.

Applications

Some of the embodiments described above have provided examples in connection with mobile devices. However, the principles and advantages of the embodiments can be used for any other systems dynamic control of single switched uplink versus multi uplink. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
a plurality of antennas including a first antenna and a second antenna;
a front end system including a plurality of transmit chains including a first transmit chain electrically connected to the first antenna and a second transmit chain electrically connected to the second antenna; and
a transceiver configured to transmit a first type of radio frequency signal and a second type of radio frequency signal through the front end system, the transceiver operable in a first mode in which transmissions of the first type of radio frequency signal and the second type of radio frequency signal are staggered over time, and a second mode in which transmissions of the first type of radio frequency signal and the second type of radio frequency signal at least partially overlap in time, the transceiver including a transmit control circuit configured to operate the transceiver in the first mode or the second mode based on comparing a transmit parameter to a threshold.

2. The mobile device of claim 1 wherein the transmit parameter is signal sensitivity and the threshold is a sensitivity threshold.

3. The mobile device of claim 2 wherein the sensitivity threshold is maximum sensitivity degradation (MSD).

4. The mobile device of claim 1 wherein the transmit parameter is power reduction and the threshold is a power reduction threshold.

5. The mobile device of claim 3 wherein the power reduction threshold is additional maximum power reduction (A-MPR).

6. The mobile device of claim 1 wherein the first type of radio frequency signal is a long term evolution (LTE) signal, and the second type of signal is a fifth generation (5G) signal.

7. The mobile device of claim 1 further including a memory including calibration data programmed therein, the threshold based on the calibration data.

8. The mobile device of claim 1 wherein the first type of radio frequency signal and the second type of signal are in a common frequency band.

9. The mobile device of claim 1 wherein the transceiver is further configured to transmit the first type of radio frequency signal through the first transmit chain and the second type of radio frequency signal through the second transmit chain when a transmit power level is greater than a power threshold.

10. The mobile device of claim 9 wherein the transceiver is further configured to transmit the first type of radio frequency signal and the second type of radio frequency signal through the first transmit chain when the transmit power level is less than or equal to the power threshold.

11. The mobile device of claim 1 wherein in the second mode, the transceiver is configured to transmit the first type of radio frequency signal by way of the first transmit chain and to transmit the second type of radio frequency signal by way of the second transmit chain.

12. The mobile device of claim 1 wherein in the second mode, the transceiver is configured to simultaneously transmit the first type of radio frequency signal and the second type of radio frequency signal by way of the first transmit chain.

13. The mobile device of claim 1 wherein in the first mode, the transceiver is configured to transmit the first type of radio frequency signal by way of the first transmit chain and to transmit the second type of radio frequency signal by way of the second transmit chain.

14. The mobile device of claim 1 wherein in the first mode, the transceiver is configured to alternate between transmitting the first type of radio frequency signal by way of the first transmit chain and to transmitting the second type of radio frequency signal by way of the first transmit chain.

15. A radio frequency communication system comprising:
    a plurality of power amplifiers configured to provide signal amplification; and
    a transceiver configured to transmit a first type of radio frequency signal and a second type of radio frequency signal via the plurality of power amplifiers, the transceiver operable in a first mode in which transmissions of the first type of radio frequency signal and the second type of radio frequency signal are staggered over time, and a second mode in which transmissions of the first type of radio frequency signal and the second type of radio frequency signal at least partially overlap in time, the transceiver including a transmit control circuit configured to operate the transceiver in the first mode or the second mode based on comparing a transmit parameter to a threshold.

16. The radio frequency communication system of claim 15 wherein the transmit parameter is signal sensitivity and the threshold is a sensitivity threshold.

17. The radio frequency communication system of claim 15 wherein the transmit parameter is power reduction and the threshold is a power reduction threshold.

18. A method of transmission in a radio frequency communication device, the method comprising:
    processing a first type of radio frequency signal and a second type of radio frequency signal for transmission using a front end system including a plurality of transmit chains;
    operating a transceiver in a first mode or a second mode based on comparing a transmit parameter to a threshold; and
    transmitting the first type of radio frequency signal and the second type of radio frequency signal through the front end system using the transceiver, including staggering transmissions of the first type of radio frequency signal and the second type of radio frequency signal when operating in the first mode, and transmitting the first type of radio frequency signal and the second type of radio frequency signal at least partially overlapping in time when operating in the second mode.

19. The method of claim 18 wherein the transmit parameter is signal sensitivity and the threshold is a sensitivity threshold.

20. The method of claim 18 wherein the transmit parameter is power reduction and the threshold is a power reduction threshold.

* * * * *